United States Patent [19]

Sandvick et al.

[11] Patent Number: 5,700,516
[45] Date of Patent: *Dec. 23, 1997

[54] REPULPABLE HOT MELT POLYMER/WAX COMPOSITIONS FOR FIBROUS PRODUCTS

[75] Inventors: Paul E. Sandvick; Calvin J. Verbrugge, both of Racine, Wis.

[73] Assignee: S. C. Johnson Commerical Markets, Inc., Sturtevant, Wis.

[*] Notice: The term of this patent shall not extend beyond the expiration date of Pat. No. 5,587,202.

[21] Appl. No.: 733,534

[22] Filed: Oct. 18, 1996

Related U.S. Application Data

[62] Division of Ser. No. 567,838, Dec. 6, 1995, abandoned, which is a continuation of Ser. No. 96,133, Jul. 22, 1993, abandoned.

[51] Int. Cl.$^6$ .................................................. D21H 19/00
[52] U.S. Cl. ........................ 427/155; 427/375; 427/391; 427/395; 162/8; 162/189; 162/191
[58] Field of Search ........................ 427/155, 375, 427/391, 395; 162/8, 189, 197; 524/488, 489, 267, 272, 278

[56] References Cited

U.S. PATENT DOCUMENTS

| | | | |
|---|---|---|---|
| 1,628,931 | 5/1927 | Todd | 162/8 |
| 2,275,659 | 3/1942 | Steinle et al. | 99/168 |
| 2,391,621 | 12/1945 | Powell, III et al. | 117/65 |
| 2,490,677 | 12/1949 | Cupery et al. | 260/29.6 |
| 2,576,914 | 12/1951 | Barrett | 428/454 |
| 2,599,339 | 6/1952 | Lippincott et al. | 260/28.5 |
| 2,676,934 | 3/1954 | Butler | 260/28.5 |
| 3,001,963 | 9/1961 | Higgins | 260/23 |
| 3,020,177 | 2/1962 | Sweeney et al. | 117/155 |
| 3,039,870 | 6/1962 | Laakso et al. | 96/87 |
| 3,165,485 | 1/1965 | Ilnyckyj et al. | 260/28.5 |
| 3,262,838 | 7/1966 | Vieth et al. | 162/8 |
| 3,287,149 | 11/1966 | Dooley et al. | 117/15 |
| 3,312,564 | 4/1967 | Barbour | 117/36.1 |
| 3,320,196 | 5/1967 | Rogers | 260/27 |
| 3,338,856 | 8/1967 | Arabian et al. | 260/28.5 |
| 3,392,131 | 7/1968 | Miles et al. | 260/28.5 |
| 3,417,040 | 12/1968 | Kremer | 260/27 |
| 3,428,591 | 2/1969 | Lewis | 260/28.5 |
| 3,461,108 | 8/1969 | Heilman | 260/78.5 |
| 3,520,842 | 7/1970 | Crean | 260/23 |
| 3,553,177 | 1/1971 | Hazen et al. | 260/78.5 |
| 3,560,455 | 2/1971 | Hazen | 260/78.5 |
| 3,560,456 | 2/1971 | Hazen | 260/78.5 |
| 3,560,457 | 2/1971 | Hazen | 260/78.5 |
| 3,629,171 | 12/1971 | Kremer et al. | 260/23.7 B |
| 3,706,704 | 12/1972 | Heilman | 260/78.5 R |
| 3,822,178 | 7/1974 | Von Koeppen et al. | 162/5 |
| 3,884,857 | 5/1975 | Ballard et al. | 260/28.5 |
| 3,991,079 | 11/1976 | Hoke | 260/327 E |
| 4,013,607 | 3/1977 | Dwyer et al. | 260/29.6 H |
| 4,117,199 | 9/1978 | Gotoh et al. | 428/486 |
| 4,152,198 | 5/1979 | Serota et al. | 162/128 |
| 4,168,255 | 9/1979 | Lewis et al. | 260/29.6 H |
| 4,289,671 | 9/1981 | Hernandez | 260/28.5 AV |
| 4,317,893 | 3/1982 | Chen et al. | 525/328 |
| 4,362,784 | 12/1982 | Kato et al. | 428/340 |
| 4,481,075 | 11/1984 | Dailly et al. | 162/145 |
| 4,540,736 | 9/1985 | Herten et al. | 524/556 |
| 4,562,226 | 12/1985 | Coombes et al. | 524/767 |
| 4,588,786 | 5/1986 | Kadono et al. | 525/327.6 |
| 4,618,450 | 10/1986 | Higgins | 252/355 |
| 4,668,536 | 5/1987 | Goodell et al. | 427/235 |
| 4,675,359 | 6/1987 | Kadono et al. | 524/832 |
| 4,693,909 | 9/1987 | Ziegler et al. | 427/156 |
| 4,748,196 | 5/1988 | Kuroda et al. | 524/276 |
| 4,826,902 | 5/1989 | Hanabata et al. | 524/168 |
| 4,859,752 | 8/1989 | Bosanec et al. | 526/209 |
| 4,871,823 | 10/1989 | Billman et al. | 526/272 |
| 4,942,193 | 7/1990 | Van Buskirk et al. | 524/276 |
| 5,081,174 | 1/1992 | Van Buskirk et al. | 524/277 |
| 5,229,450 | 7/1993 | Van Buskirk et al. | 524/487 |
| 5,298,568 | 3/1994 | Suzuki | 525/327 |
| 5,587,202 | 12/1996 | Sanduick et al. | 427/155 |
| B1 4,358,573 | 11/1983 | Verbrugge | 526/272 |

FOREIGN PATENT DOCUMENTS

| | | |
|---|---|---|
| 49-85305 | of 1974 | Japan . |
| 56-91097 | of 1981 | Japan . |
| 2-1671 | of 1990 | Japan . |
| 4-089806 | 3/1992 | Japan . |
| 4-089809 | 3/1992 | Japan . |
| 4-089854 | 3/1992 | Japan . |
| 1593331 | 7/1981 | United Kingdom . |
| 9105107 | 4/1991 | WIPO . |
| WO 91-05107 | 4/1991 | WIPO . |

OTHER PUBLICATIONS

J.S. Michelman, "Repulpability of coated corrugated paperboard," *Tappi Journal*, Oct. 1991, p. 79ff.
Article, *Tappi Journal*, vol. 75, No. 4, Apr., 1992, pp. 27, 39.
T. Kauffman, "Environmentally Conscious Hot Melt Adhesives," *Tappi Notes, 1991 Hot Melt Symposium*, pp. 13–22.
J. G. E. McEwen, et al. "Improving the repulpability of wax coated corrguated paperboard," *Tappi Journal*, vol. 76, No. 7, Jul., 1993, pp. 116–121.

*Primary Examiner*—Jeffrey T. Smith
*Attorney, Agent, or Firm*—Richard E. Rakoczy

[57] ABSTRACT

Hot melt wax compositions are described that render fibrous products such as paper, paperboard and corrugated paper containers water-resistant at room temperature, but enable such articles to be repulped and recycled when the coated articles are repulped in a heated nearly neutral to alkaline aqueous medium. The compositions comprise from about 20% to 97.5% by weight of a water-repellent wax that is a solid at 20° C.; from about 2.5% to 50% by weight of an addition polymer of from about 50 to 95 mole percent of an ethylene-1,2-dicarboxylic acid or anhydride and from about 5 to 50 mole percent of at least one additional ethylenically unsaturated monomer selected from the group consisting of 1-alkenes having from about 4 to 60 carbon atoms wherein the polymer is dispersible in the water-repellent wax; optionally from about 1 to 90 mole percent of the carboxyl groups in the polymer may be further modified by reaction with a substituted or unsubstituted monoalcohol or monoamine; and optionally, from about 5% to 75% by weight of at least one fatty acid selected from the group consisting of fatty acids containing from about 12 to 48 carbon atoms. The compositions are solid at 20° C., but start to become fluid between about 50° C. to 95° C.

44 Claims, No Drawings

REPULPABLE HOT MELT POLYMER/WAX COMPOSITIONS FOR FIBROUS PRODUCTS

This application is a divisional of application Ser. No. 08/567,838 filed on Dec. 6, 1995 now abandoned, which is a continuation of U.S. Ser. No. 08/096,133 filed on Jul. 22, 1993, abandoned.

TECHNICAL FIELD

This invention relates to a hot melt polymer/wax composition that renders cellulosic fibers, paper, paperboard and corrugated paper containers water-resistant at room temperature, but enables such articles to be repulped and recycled when the articles coated or impregnated with such compositions are placed in a heated nearly neutral to alkaline pH aqueous medium.

BACKGROUND ART

For quite some time, water-resistant paper and paperboard articles have been used as wrapping or packaging for moist or wet foods, many of which are refrigerated. For example, corrugated paperboard containers are cascade-coated or curtain-coated with paraffin wax-based compositions applied by passing the corrugated paper containers beneath a curtain of molten paraffin wax. These water-resistant containers are then used for packaging produce, meats, poultry and fish that must be refrigerated. Often the containers themselves are filled with ice in addition to the food itself. Ordinary untreated paperboard containers cannot withstand such exposure to water.

U.S. Pat. No. 4,668,536 to Goodell et al. teaches an apparatus for applying a coating of paraffin wax to sheets of corrugated paperboard by feeding the sheets through a bath of molten wax held in an elongated tank. Corrugated paper containers produced by such processes have not been considered recyclable because the wax cannot be efficiently separated from the fibers making up the paper using conventional repulping equipment.

Ecological concerns have focused on disposal of water-resistant paper and corrugated paper containers because landfills have been filling up at an alarming rate. If such containers could be recycled, this would reduce the amount of waste containers that must be placed in landfills as well as the amount of virgin timber needed to produce the paper.

U.S. Pat. No. 1,628,931 to Todd teaches a process for extracting wax from waxed paper by treating it with a solution of aqueous trisodium phosphate alone or with other alkaline materials. The wax becomes emulsified, leaves the paper fibers and rises to the top of the treating solution where it can be skimmed off. The process also serves to de-ink the papers.

An article by J. S. Michelman et al. entitled "Repulpability of coated corrugated paperboard" in the October 1991, *Tappi Journal*, pp. 79ff, notes that curtain coated hot melt wax compositions are considered to be non-repulpable. It proposes the use of water-based coatings in place of hot melt wax curtain coatings. The Michelman et al. article states water-based coatings provide certain advantages in that they do not contain solvents, are nonflammable and yet have the ability to provide water and grease resistance to corrugated paper containers.

Water-based coatings do provide these advantages, but their use requires a change in the type of coating equipment used to manufacture coated, water-resistant paper, paperboard and corrugated paper containers. In practice, these coatings do not have sufficient water resistance to withstand long periods of exposure to ice water such as is required for produce or meat containers. Use of water-based coatings on hydrophilic substrates such as corrugated paper produces a wet surface that must then be dried by the application of heat.

Hot melt coatings are typically solvent-free and applied at 60°–95° C. depending upon the type of water-resistant agent being used. Hot melt coatings immediately solidify as they cool below their melting point. Thus, they do not require a significant further drying step of the type which may be necessary with water-based coatings. An increase in the drying time or energy needed to dry the coatings is a disadvantage because it increases cost and lengthens the time needed before the paper or corrugated paper containers can be handled. In a conventional cascade or curtain coating process, corrugated paper containers are placed at one end of a cascade or curtain coating machine having a "curtain" or wall of molten wax coating that is poured continuously over the containers passing through the curtain. After coating, the containers pass through an area of the machine that has a fan to blow ambient air over the containers and reduce their temperature to the point where the hot melt coating solidifies. The containers are then simply removed from the other end of the machine and stacked for shipping. Thus, hot melt coatings have the advantage of being relatively easy to process. They do not require a change in coating equipment from the type of equipment already owned by many commercial manufacturers of coated paper and corrugated paper containers.

Therefore, there is a need for a hot melt coating for use with paper such as wax paper for food wrap, paperboard containers such as milk and juice cartons and corrugated paper containers such as those used to package produce, meats, poultry and fish that permits the paper articles to be repulped and recycled, but can be applied using conventional hot melt wax coating equipment.

Patent Cooperation Treaty Published International Patent Application No. WO 91/05107 to Michelman teaches repulpable hot melt paper coatings which are a combination of at least one wax and at least one chemical compound incorporated within the wax where the compound is capable of dispersing the wax in a substantially aqueous environment. The compound must by itself act as a dispersant for the wax or must be capable of being chemically modified so as to act as a latent dispersant for the coating in an aqueous environment. The compound may be a nonionic, anionic or cationic emulsifier, dispersant, surfactant or surface acting agent. Examples of anionic dispersants are said to include acids, esters, alcohols, sulfonates and soaps. A specific example of an anionic dispersant given is stearic acid in an amount of from about 10% to 30% by weight and it is becomes capable of emulsifying or dispersing the coating by subjecting the coating containing the stearic acid to an aqueous solution of a strong base such as sodium hydroxide or potassium hydroxide. However, the Michelman International Application does not suggest our use of polymers which contain carboxyl groups which will be described below.

A recent article from the April, 1992, *Tappi Journal*, Vol. 75, No. 4, pages 37 and 39 refers to work done by IL Returpapper, the largest Scandinavian wastepaper collector, and some of its owners on the repulping of waxed corrugated boxes. The article reports that their work focused on the use of self-dispersing waxes based on the addition of aluminum stearate soaps to the wax blend. The article states such aluminum soaps neither reduce the water resistance nor increase the water vapor permeability of the wax film. Under slightly alkaline conventional repulping conditions, the aluminum soaps are said to dissociate and form sodium soaps that disperse the wax away from the paper pulp.

One problem associated with prior art hot melt wax coatings is a tendency for such coatings to stress crack when the coated article is bent or formed.

U.S. Pat. No. 3,629,171 to Kremer et al. provides a hot melt wax composition having reduced stress cracking composed of a wax such as paraffin, an ethylene-vinyl acetate copolymer, a sufficient amount of a wax-compatible, non-corrosive carboxylic acid such as oleic acid, lauric acid, and pentacosanoic acid to provide the composition with a total acid number of from 5 to 200, and a solid butyl rubber. The carboxylic acid can be present in an amount of from 10–150 parts per 100 parts of wax such as paraffin. Nothing is said about the repulpability of such compositions.

U.S. Pat. No. 3,417,040 to Kremer is similar to the '171 Patent in that it requires a wax such as paraffin, an ethylene/vinyl acetate copolymer and an acid component. However, the acid component must contain at least 35% by weight acid and at least 5% by weight liquid of boiling point greater than 300° F. (149° C.) at 7 mm Hg pressure. The goal is a wax composition with increased melt viscosity that permits lowering the ethylene/vinyl acetate copolymer concentration in the coating. Examples of liquids are liquid organic carboxylic aids, mineral oils or a styrene, butene or propene polymer.

U.S. Pat. No. 3,001,963 to Higgins teaches hot melt wax compositions that have a reduced tendency to foam due to the presence of a mixture of a polymeric vinyl ester such as polyvinyl caproate and stearic acid. Higgins teaches that the stearic acid is preferably used in an amount that does not exceed 0.1%. Similarly, the polyvinyl caproate is used in an amount of from about 1 to 25 p.p.m. of the total composition.

U.S. Pat. No. 3,338,856 to Arabian et al. teaches blends of waxes with up to 50% of copolymers of ethylene and terminally ethylenically unsaturated organic compounds containing 3–5 carbon atoms such as alpha-olefins, vinyl acetate, and ethyl acrylate. The presence of the polymer is said to reduce solid phase separation or blooming on the surfaces of the coatings made from such blends. The coatings are used on paper and carton boards as well as fibers and cloth. Nothing is taught concerning repulpability.

U.S. Pat. No. 3,165,485 to Ilnyckyj et al. teaches sealing waxes used to coat materials such as paper for wrapping bread where the wax further includes 10–40% of a copolymer of ethylene and a diester of fumaric or maleic acid. Nothing is taught concerning repulpability.

U.S. Pat. No. 4,362,784 to Kato et al. teaches packaging materials for food products which are poured into the package in a molten state. The packaging materials are coated with a blend of (a) an ethylene/vinyl acetate polymer, (b) a copolymer of ethylene or an alpha olefin with, for example, maleic anhydride, optionally, (c) a tackifying agent such as a specific blend of (a) with an olefin/maleic anhydride resin, and, optionally, (d) 1–10% of a wax.

Other wax-based compositions that can be applied by a hot melt method as well as from a solvent solution include U.S. Pat. No. 2,599,339 to Lippincott et al. Lippincott teaches improved wax compositions that contain copolymers of ethylene-1,2-dicarboxylic acids such as maleic acid with comonomers such as ethylene, octylene and octadecene as well as other unsaturated acids such as acrylic acid or unsaturated esters such as vinyl acetate or allyl stearate. Before adding the copolymer to the wax to make the coating composition, the copolymer is modified with an alcohol or an amine such as ethyl alcohol, ethyl amine, diethylamine, octadecyl amine or dioctadecylamine. The waxes are then modified by the addition of 0.5% to 5% or more, preferably from 0.1% to 1% of the modified copolymer.

U.S. Pat. No. 2,676,934 to Butler teaches hydrocarbon wax compositions for impregnating wrapping paper that further contain from 0.1% to 30% by weight of an esterified styrene-maleic anhydride resin. The styrene-maleic anhydride polymer is completely esterified with a fatty alcohol such as decyl, dodecyl or hexadecyl alcohol. The coating is said to be more resistant to cracking and crushing.

U.S. Pat. No. 3,428,591 to Lewis teaches a wax composition containing a graft polymer of polyethylene used to coat paperboard. The preferred coating is composed of 96–99.1% wax such as paraffin or microcrystalline waxes and 0.1–4% of a polyethylene graft copolymer where the polyethylene contains 0.1–5% by weight of maleic anhydride grafted to the polyethylene chain. This coating can be applied as a hot melt or by a solvent system. It gives superior wet strength to paperboard.

U.S. Pat. No. 3,287,149 to Dooley et al. teaches repulpable printed paper having a water-resistant coating formed from a copolymer that is the copolymerization product of (a) styrene with (b) a half-ester of an alcohol having 1 to 8 carbon atoms with an unsaturated dicarboxylic acid such as fumaric or maleic acid. These compositions are applied by dissolving the polymers in water. They are removed by exposing the coated paper to a 2% aqueous sodium hydroxide solution of the type commonly used in commercial paper de-inking processes. However, the Dooley et al. Patent does not use any wax to dilute the polymer. It is thus a rather expensive coating to apply since the entire water-resistant coating is a styrene-maleic anhydride half ester copolymer.

U.S. Pat. No. 3,262,838 to Vieth et al. is similar to the Dooley '149 Patent above. However, Vieth et al. teach a repulpable paper made from a coating composition applied from a solvent solution that comprises 15–30% of an acrylic acid/acrylic ester polymer and a thermosetting aminoplast resin. The entire water-resistant coating composition is composed of these two ingredients. Paper coated with the composition is said to be repulpable in a dilute alkaline solution.

U.S. Pat. No. 2,391,621 to Powell, III, et al. teaches a method of coating paper to increase its moisture resistance using a coating composition based on a polymer containing three different components: maleic anhydride, vinyl halides and vinyl esters of lower fatty acids. The coating may contain a wax in an amount of from about 1–50% of the polymer. Nothing is taught about the repulpability of such a composition which is applied from a solvent solution or from an aqueous emulsion.

As noted in the Michelman et al. Article above, water-based coating compositions have also been pursued for making paper and paper-based containers water-resistant. These coatings have been described as leaving the paper products repulpable.

U.S. Pat. No. 4,117,199 to Gotoh et al. teaches a coated paper made by coating a paper substrate with an aqueous emulsion containing a synthetic rubber latex and a wax emulsion in an amount of 5 to 200 parts by weight of the solid wax per 100 parts by weight of the solid synthetic rubber in the latex. The coated paper is then dried at a temperature that is the same as or higher than the melting point of the wax. The resulting coated paper is said to be highly repulpable. The synthetic rubber latex is made from copolymers of butadiene with at least one ethylenically unsaturated monomer such as methyl methacrylate, styrene and acrylonitrile. The synthetic rubber may further contain at least one ethylenically unsaturated carboxylic acid such as acrylic acid, methacrylic acid, crotonic acid and maleic acid.

U.S. Pat. No. 2,576,914 to Barrett teaches coated papers made by applying a dispersion or suspension of a suitable pigment along with a long chain unsaturated fatty acid and a copolymer that is an alkyl half-ester of maleic anhydride copolymerized with a polymerizable vinyl compound. These coating compositions are preferably applied as aqueous liquids. A wax can be present in small proportions as an adjuvant.

British Pat. No. 1,593,331 to Vase teaches a method for treating paper and paperboard to make them water and vapor resistant by coating them with an unpigmented aqueous latex coating composition. The latex coating composition is an acrylic polymer and a metal stearate or wax where the wax is at least 20% by weight of the total acrylic polymer and metal stearate present. The metal stearate is preferably calcium stearate. After application, the coating is dried onto the paper. It contains 50-80% acrylic polymer.

Other examples of aqueous emulsions and emulsifiable compositions for coating paper and the like are found in U.S. Pat. No. 3,020,178 to Sweeney et al. (dispersions of water insoluble linear polymers of esters of acrylic acid or methacrylic acid which may further contain adhesion promoting agents such as carboxylic acids in the form of free acids or salts); U.S. Pat. No. 3,392,131 to Miles et al. (salts of ethylene-crotonic acid polymers as emulsifying agents for paraffin waxes and asphalt); and U.S. Pat. No. 3,520,842 to Crean (blends of petroleum wax, a polymeric olefin material and a fatty acid are added as a blend to water containing an amine soap-forming agent such as an alkanolamine, agitating the mixture and subjecting it to homogenization to form an aqueous emulsion coating composition).

Japanese Kokoku Pat. No. HEI 2[1990]-1671 to Yamazaki et al. teaches water vapor-resistant corrugated board made by coating the board with a mixture of an acrylic emulsion and a wax emulsion and drying the coating. The objective is to obtain recyclable paperboard. The acrylic emulsion is said to be an "acryl-styrene" emulsion in an amount of from 90:50 to a wax emulsion in an amount of 10-50. Due to the water present, the coatings must be dried using hot-air heating, infrared heating or microwave heating.

Japanese Kokai Patent Application No. SHO 56[1981]-91097 to Kano et al. teaches a method for the manufacture of paper for fruit bags. The paper is treated with an aqueous emulsion consisting of 81-93% of petroleum wax, 5-15% of fatty acids such as stearic acid and 2-4% of a resin such as a melamine-formaldehyde resin or a methyl methacrylate resin. These coatings are said to make the paper water-repellent for a long period. The resins can be selected from one or more of styrene, methylmethacrylate, and methacrylic acid resins.

Japanese Kokai Patent Application No. SHO 49[1974]-85305 to Fujiya et al. teaches a method for the manufacture of waterproof paper that is redispersible with warm water. It is made by soaking the paper with a polyethylene emulsion or with blends of aluminum salts and waxes such as paraffin or zirconium salts and wax. The coating material was only identified by the manufacturer's name for the materials used.

U.S. Pat. No. 4,748,196 to Kuroda et al. teaches a water repellent composition which is an aqueous emulsion prepared by emulsifying in water (A) a wax having a melting point from 40° C. to 90° C. and (B) a 1-alkene/maleic anhydride polymer, or a partially esterified product thereof in the presence of (c) a water soluble alkaline compound and/or a nonionic emulsifier. The emulsions are used to impart water repellency to gypsum, cement, paper, wooden boards or fibers. Nothing is suggested regarding repulpability of articles treated with such emulsions.

U.S. Pat. No. 3,312,564 to Barbour teaches transfer sheets that are a base sheet coated with an aqueous emulsion of a hard wax, a non-film forming resin, a fatty acid and a base followed by hardening the coating onto the base sheet. The coatings are heated to transfer them permanently to a substrate where the heat fixes the transfer to the substrate and makes it smudge proof. Nothing is taught about the use of such coatings for making paper substrates water-resistant and later repulpable.

U.S. Pat. No. 2,275,659 to Steinle et al. teaches a water removable wax coating that is placed on the skin or peel of a fruit or vegetable. The coating is an aqueous coating containing both a wax and a substance that will swell upon contacting a volume of water thereby causing the protective coating to loosen itself from the skin or peel. Examples of such swellable materials are bentonite, gelatin, Irish moss and gums such as karaya, tragacanth and arabic. Since these compositions are always sensitive to water, they could not be used to render paper or paperboard products water-resistant.

In the area of coatings for substrates such as floors, U.S. Pat. No. 3,320,196 to Rogers teaches a coating composition containing a polyligand emulsion polymer that is (a) a terpolymer of a methacrylate monomer, an unsaturated monomer having a carboxylic acid group and an unsaturated monomer that is free of methyl groups on the alpha carbon atom, (b) a resin cut of a low molecular weight alkali soluble resin which can be a maleic anhydride or acrylic acid resin, (c) an aqueous base, and (d) a zirconium derivative that is used to reversibly cross-link the polymers. Waxes and fatty acid soaps may also be optionally included. The coatings formed can be removed by exposing them to aqueous alkaline solutions. The coatings function as floor polishes that are strippable using aqueous alkaline solutions.

U.S. Pat. No. 4,013,607 to Dwyer et al. teaches self-stripping coating compositions similar to those taught by Rogers which may include waxes, but which require a pH of greater than 9 and do not require the use of zirconium-derivatives to achieve self-stripping properties. These compositions are said to be useful for coating rigid surfaces such as for use as self-strippable floor coatings although they can also be used to impregnate textiles, leather, paper, or other porous or fibrous materials.

Thus, although a number of different types of coatings have been proposed, there is still a need for a hot melt coating composition for use in rendering fibrous materials such as paper and paper-based materials water-repellent using conventional curtain coating equipment, but which permits the coated paper or paper-based product to be recycled using conventional repulping equipment and techniques.

SUMMARY DISCLOSURE OF THE INVENTION

One object of this invention is to provide compositions for rendering paper, paperboard and corrugated paper articles water-resistant, but that can later be removed to recover the paper pulp using conventional paper repulping equipment and solutions. These coatings can also be used as hot melt impregnating or binder compositions for binding masses of, for example, cellulosic fibers together to form molded fibrous products. Another object of this invention is to provide such compositions in a form that can be applied using conventional hot melt wax paper, paperboard and corrugated paper coating equipment such as curtain coating or cascade coating machinery. The presence of the polymer may provide improved flexibility to the compositions of the present invention.

A particularly advantageous object of this invention is to provide such coating compositions that can be removed using heated aqueous solutions of pH values from about 7.1 to 13, more preferably from about 7.1 to 11 and, most preferably, having nearly neutral to slightly alkaline pH values in the range of from about 7.1 to 8.5. Since both the polymer and the fatty acid have carboxyl groups which become hydrophilic upon exposure to bases, the compositions of the present invention have the advantage of providing coated fibrous articles that are easier to repulp.

These and other objects of the present invention are provided by a hot melt wax composition that is dispersible in a heated nearly neutral to alkaline aqueous medium comprising A. from about 20% to 97.5%, more preferably from about 20% to 80%, and most preferably, from about 50% to 70% by weight based upon the total weight of the composition of a water-repellent wax that is a solid at 20° C. such as paraffin wax;

B. from about 2.5% to 50%, more preferably from about 5% to 30%, and most preferably, from about 10% to 25% by weight based upon the total weight of the composition of at least one addition polymer selected from the group consisting of a polymer of from about 5 to 95 mole percent of at least one ethylenically unsaturated monocarboxylic acid monomer containing a free carboxyl group and from about 5 to 95 mole percent of at least one additional ethylenically unsaturated monomer, a polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group, preferably maleic anhydride, and from about 5 to 50 mole percent of at least one additional ethylenically unsaturated monomer, and a polymer of a total of from about 5 to 95 mole percent of at least one of the ethylenically unsaturated monocarboxylic acid monomers and at least one of the ethylenically-unsaturated dicarboxylic monomers and from about 5 to 95 mole percent of at least one additional ethylenically unsaturated monomer, wherein the additional ethylenically unsaturated monomer is selected from the group consisting of 1-alkenes having from about 4 to 60 carbon atoms; alkyl vinyl ethers having an ether alkyl group of from about 8 to 60 carbon atoms, and alkyl acrylates or alkyl methacrylates having an alkyl group of from about 8 to 60 carbon atoms, wherein the polymer is dispersible in the water-repellent wax such as a polymer of (i) 50 to 95 mole percent maleic anhydride with (ii) 5 to 50 mole percent of (a) 1-decene or 1-octadecene, or (b) a blend of 1-alkenes having from about 20 to 24 or from about 24 to 28 carbon atoms or (c) a combination of (a) and (b) wherein from about 1 to about 90 mole percent of the carboxyl groups contributed to the polymer by the monocarboxylic acid monomer or by the dicarboxylic acid monomer may optionally be further partially esterified or converted into amide or imide groups such as by reaction with an alcohol or an amine such as taurine; and C. optionally, up to 77.5%, such as from about 5% to 77.5%, more preferably from about 5% to 60%, and most preferably, from about 10% to 40% by weight based upon the total weight of coating composition of at least one fatty acid selected from the group consisting of natural or synthetic fatty acids containing from about 12 to 48 carbon atoms, preferably from 16 to 22 carbon atoms, such as stearic acid, wherein the fatty acid is compatible with the polymer and wax, the total amount of wax, polymer and fatty acid comprising 100% of the total composition and the polymer is at least 2.5% by weight of the total composition wherein the composition is a solid at 20° C., but starts to become fluid between about 50° C. and 95° C.

BEST MODE FOR CARRYING OUT THE INVENTION

The hot melt wax compositions of the present invention require at least two, and most preferably, three ingredients to render them suitably redispersible in a heated nearly neutral to alkaline pH aqueous medium.

The first required ingredient is a conventional water repellent wax of the type commonly used in hot melt coatings for paper products. The wax must be capable of rendering fibrous materials water-resistant and should not dissolve when placed in contact with water. The wax also must be a solid at room temperature (hereinafter about 20° C. to 25° C.) so a coating is placed on the fibrous material that is solid at the typical temperature of use that ranges between about −20° C. and about 45° C. The wax also should have a melting point between about 50° C. and 130° C. so the composition can be applied with conventional cascade or curtain coating equipment and removed in a heated aqueous nearly neutral to alkaline pH medium. Preferably, the wax also should be relatively economical in cost.

Examples of such waxes are paraffin waxes such as a commercially available paraffin wax having a melting point between about 51° C. and 57° C. or between about 68° C. and 71° C., with paraffin wax having a melting point of from about 51° C. to about 57° C. being presently preferred because it provides excellent water-repellency properties to the paper, is economical and can be applied and removed at relatively low temperatures. Examples of other waxes that may be useful by themselves or, more preferably, in combination with the paraffin waxes are microcrystalline waxes, oxidized microcrystalline waxes, beeswax, carnauba wax, montan wax and other synthetic and naturally derived waxes. Higher melting point waxes such as polyethylene, polypropylene and modified polyethylene and polypropylene waxes generally have melting points too high to be useful in the compositions of the present invention although they may be useful in small amounts of less than about 5% of the total wax present to modify the coating properties if desired.

The compositions of the present invention comprise from about 20% to 97.5%, more preferably from about 20% to 80%, and most preferably, from about 50% to 70% by weight of wax based upon the total weight of hot melt wax composition.

The second required ingredient is at least one of an addition polymer of from about 5 to 95 mole percent of at least one ethylenically unsaturated monocarboxylic acid and from about 5 to 95 mole percent of at least one additional unsaturated monomer or a polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group and from about 5 to 50 mole percent of at least one additional ethylenically unsaturated monomer or combinations of such polymers. The additional ethylenically unsaturated monomer is selected from the group consisting of 1-alkenes having from about 4 to 60 carbon atoms, alkyl vinyl ethers having an ether alkyl group of from about 8 to 60 carbon atoms, and alkyl acrylates and methacrylates having an alkyl group of from about 8 to 60 carbon atoms wherein the polymer is compatible with the water-repellent wax, as well as with the fatty acid, at room temperature (hereinafter about 20° C. to 25° C.). The term "compatible" means that the wax and any fatty acid can be melt dispersed into the polymer without significant formation of separate phases when the blend of polymer, wax and any fatty acid is cooled to room temperature. More preferably, the polymers are addition polymers of 50 to 95 mole percent of an ethylene-1,2-dicarboxylic acid or anhydride and from about 5 to 50 mole percent of the above 1-alkenes.

The polymers must have a melting point that is such that the combination of polymer, wax and any fatty acid is a solid at the coated or impregnated product's expected temperature of use such as room temperature. However, the hot melt polymer/wax (and optionally fatty acid) composition must also start to become fluid between about 50° C. and 95° C., so that the composition can be coated at temperatures no greater than about 130° C. and so that repulping can take place in a heated nearly neutral to alkaline pH aqueous medium. One of ordinary skill in the art can readily determine the types of compositions meeting this requirement simply by evaluating the melting points and viscosities of the compositions.

Use of polymers containing sufficient carboxyl groups to render the polymer and thus, the hot melt polymer/wax composition, water sensitive at the temperature of use should be avoided. The polymers used must be water-resistant at the desired temperature of use to be useful in the present invention.

The term "ethylenically unsaturated monocarboxylic acid" includes acrylic acid, methacrylic acid, crotonic acid, aconitic acid, itaconic acid and the like. Acrylic acid and methacrylic acid are presently preferred.

The ethylene-1,2-dicarboxylic acid or anhydride includes maleic acid, methyl maleic acid, dimethyl maleic acid, fumaric acid, and other alkylated maleic and fumaric acids as well as their anhydride analogs such as maleic anhydride and derivatives thereof. For example, other derivatives of ethylene-1,2-dicarboxylic acids or their anhydride analogs also may be useful such as benzyl maleic acid. In any event, the ethylene-1,2-dicarboxylic acid or anhydride must be capable of providing an addition polymer that is soluble in the wax, but is capable of acting to disperse the wax away from coated or impregnated substrates upon exposure to nearly neutral to alkaline heated aqueous media as a result of the carboxylic acid groups that are ionized by neutralization to make them hydrophilic.

As will be described below, in some cases, the ethylenically unsaturated monocarboxylic acid or ethylene-1,2-dicarboxylic acid or anhydride may be further modified by esterification, imidization or amidation to enable the polymer to more effectively remove the wax coating from a coated or impregnated substrate. Maleic anhydride is the presently preferred ethylene-1,2-dicarboxylic acid derivative.

It is also contemplated that polymers containing both an unsaturated monocarboxylic acid monomer and an unsaturated dicarboxylic acid monomer as well as the additional ethylenically unsaturated monomers will be useful in the compositions of the present invention.

The additional ethylenically unsaturated monomers that are reacted by conventional addition polymerization with the ethylenically unsaturated monocarboxylic acid or ethylene-1,2-dicarboxylic acid or anhydride provide the polymer with solubility in the hydrophobic wax and any fatty acid present in the compositions of the present invention. One or more of these monomers can be used. The carbon chain length of the additional ethylenically unsaturated monomer is selected to provide the desired degree of compatibility with the wax and any fatty acid. Preferably, more than one additional ethylenically unsaturated monomer is used since this enables one to more easily balance the hydrophobicity of the polymer needed for wax and fatty acid compatibility and water resistance with the hydrophilicity contributed by the carboxylic acid groups, the latter of which is needed to carry the composition away from the coated fibrous product during repulping operations. A combination of a lower chain length monomer with a higher chain length monomer or blend of monomers such as a combination of 50 to 95 mole percent of maleic anhydride with 5 to 50 mole percent of a combination of 1-decene with a $C_{20}$–$C_{24}$ 1-alkene blend in a 50:50 mole ratio or 1-octadecene with a $C_{24}$–$C_{28}$ 1-alkene blend in a 20:80 mole ratio can provide this desirable balance of properties. Aromatic monomers such as styrene and alpha-methyl styrene may render the polymer incompatible with the wax and/or fatty acids and thus are used in very limited amounts of no more than about 10 to 20 mole percent and, more preferably, are not included in the polymers used in the present invention.

The alkyl vinyl ethers useful as comonomers are those having an ether alkyl group of from about 8 to 60 carbon atoms such as octyl vinyl ether, lauryl vinyl ether, hexadecyl vinyl ether, octadecyl vinyl ether, behenyl vinyl ether, triacontyl vinyl ether, tetracontyl vinyl ether and hexacontyl vinyl ether. Monomers having ether alkyl groups of from about 12 to 22 carbon atoms are preferred such as octadecyl vinyl ether.

The alkyl acrylates and alkyl methacrylates useful as comonomers are those having an alkyl group of from about 8 to 60 carbon atoms such as octyl acrylate, octyl methacrylate, lauryl acrylate, lauryl methacrylate, hexadecyl acrylate, hexadecyl methacrylate, octadecyl acrylate, octadecyl methacrylate, behenyl acrylate, behenyl methacrylate, triacontyl acrylate, triacontyl methacrylate, tetracontyl acrylate, tetracontyl methacrylate, hexacontyl acrylate and hexacontyl methacrylate. Monomers having alkyl groups of from about 12 to 22 carbon atoms are preferred.

The 1-alkenes suitable for use in the compositions of the present invention have from 4 to about 60 carbon atoms and include the following: 1-butene; 1-pentene; 1-hexene; 1-heptene; 1-octene; 1-nonene; 1-decene; 1-dodecene; 1-tetradecene; 1-hexadecene; 1-heptadecene; 1-octadecene; 2-methyl-1-butene; 3,3-dimethyl-1-pentene; 2-methyl-1-heptene; 4,4-dimethyl-1-heptene; 3,3-dimethyl-1-hexene; 4-methyl-1-pentene; 1-eicosene; 1-docosene; 1-tetracosene; 1-hexacosene; 1-octacosene; 1-triacontene; 1-dotriacontene; 1-tetratriacontene; 1-hexatriacontene; 1-octatriacontene; 1-tetracontene; 1-dotetracontene; 1-tetratetracontene; 1-hexatetracontene; 1-octatetracontene; 1-pentacontene; 1-hexacontene and mixtures thereof with straight chain 1-alkenes being presently preferred.

Optionally, other additional ethylenically unsaturated monomers may be included in minor amounts of up to about 20 weight percent, more preferably no more than about 10 weight percent, of the total polymer to provide specific properties provided that such monomers do not detrimentally to a significant degree affect the water resistance of the hot melt compositions or the ability of the polymers to be removed upon exposure to heated nearly neutral to alkaline aqueous media. Examples of such monomers may be organofunctional monounsaturated monomers such as polyethoxylated acrylates and methacrylates as well as acrylates and methacrylates containing sulfate or sulfonate groups. Examples of such monomers are SIPOMER® HEM-5 which is $H_2CC(CH_3)COO(CH_2CH_2O)_5H$ and SIPOMER® HEM-10 which is $H_2CC(CH_3)COO(CH_2CH_2O)_{10}H$ which are available from Rhone-Poulenc Surfactants & Specialties of Cranbury, N.J., an ethoxylated nonylphenol acrylate sold under the designation "CD-504" by Sartomer Company, Inc. of West Chester, Pa., Behenylpolyethoxyethyl Methacrylate (BPEEM) which is $H_2C=C(CH_3)COO(CH_2CH_2O)_{25}C_{22}H_{45}$ sold under the tradename SIPOMER® BEM by Rhone-Poulenc, and the series of proprietary surface active monomers available under the designations "SAM 185N, 186N and 187N" which are nonionic in nature and "SAM 181A, 183A, 184A and 211A" which are anionic sulfates or sulfonates in nature by the Specialty Chemicals, Chemicals Group of PPG Industries, Inc. of Gurnee, Ill. The SAM monomers are said to be represented by the general structure:

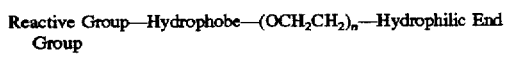

The nonionic SAM monomers are beige waxy solids provided as 100% active materials having HLB values of 6.9 (185N), 9.9(186N) and 14.0 (187N). Three of the anionic materials are provided as 30% active content liquids in water having HLB values of 23.1 (181A), 19.6 (183A), and 16.1 (184A) and each had a pH value of 7.2. The SAM 211A material is provided as a beige viscous liquid at 100% actives content having an HLB value of 43.8 with a pH of 7.3. The viscosity in centipoise (Pascal.seconds) for the SAM materials and the temperature at which the viscosity was measured were reported as follows: 185N: 247 (0.247) @ 50° C.; 186N: 277 (0.277) @ 50° C.; 187N: 170 (0.170) @ 60° C.; 181A: 45.1 (0.045) @ 50° C.; 183A: 60 (0.060) @ 25° C.; 184A: 51 (0.051) @ 25° C.; and 2170 (2.170) @ 50° C. The melting points of the SAM materials reported by the manufacturer were as follows: 185N: 40° C.; 186N: 40° C.; 187N: 49° C.; and 211A: 40° C.

Those skilled in the art will appreciate that the 1-alkenes can be used in the form of pure materials such as 1-decene or 1-octadecene or in the form of mixtures of various 1-alkenes. This is particularly true for the higher 1-alkenes where it is preferred for economic reasons to use mixtures of the higher 1-alkenes (i.e., those having more than about 20 carbon atoms per molecule—"$C_{20+}$1-alkenes"). For example, a mixture of $C_{30+}$ 1-alkenes of the type described in U.S. Pat. No. 3,553,177 to Hazen et al. (a mixture of even carbon number chain length 1-alkenes) or longer chain 1-alkenes having an average of about 48 carbon atoms per molecule as in U.S. Pat. No. 4,748,196 to Kuroda et al. (Preparation Example 1) may be used. Another mixture of higher 1-alkenes is a mixture of $C_{20}$ to $C_{24}$ 1-alkenes which is commercially available from Shell Chemical Company of Houston, Tex., or Chevron Corporation of Houston, Tex., or a mixture of $C_{24}$ to $C_{28}$ 1-alkenes available from Chevron Corporation. The 1-alkenes should be essentially monoolefinic because diolefins cause gel formation and cross-linking. Small amounts of diolefins, typically less than 2% by weight, can be tolerated as an impurity in the higher 1-alkene monomer.

More preferably, a combination of 1-alkenes is used to form what is sometimes loosely called a "terpolymer" based on the presence of three (and sometimes more) components in the polymer: the ethylene-1,2-dicarboxylic acid or anhydride and two types of 1-alkenes, one or both of the latter of which may be blends of 1-alkenes. Examples of such "terpolymers" composed of 49–60 mole percent of a maleic anhydride unit, 10–40 mole percent of a lower 1-alkene unit having from 4 to 16 carbon atoms and 40–10 mole percent of at least one higher 1-alkene unit having at least 18 carbon atoms and how they are made can be found in U.S. Pat. No. B1 4,358,573 to Verbrugge. U.S. Pat. No. 4,871,823 to Billman et al. teaches addition polymers containing from about 55 to 95 mole percent of maleic anhydride units and from about 5 to 45 mole percent of units derived from 1-alkenes having at least 4 carbon atoms where the polymer may contain one or more 1-alkenes.

Copolymers and other addition polymers of ethylenically unsaturated monocarboxylic acids and ethylene-1,2-dicarboxylic acids or anhydrides are well-known in the art and are commercially available. Examples of the latter preferred polymers containing ethylene-1,2-dicarboxylic acids and anhydrides are shown by the Verbrugge and Billman et al. Patents noted above. Other examples of such polymers and method of their manufacture can be found in U.S. Pat. Nos. 3,461,106 (Heilman), 3,553,177 (Hazen), 3,560,455 (Hazen), 3,560,456 (Hazen), 3,560,457 (Hazen), 3,706,704 (Heilman) and 4,859,752 (Bosanec et al.). The manner by which such addition polymers are produced forms no part of the present invention.

The amount of 1-alkene present in the polymer ranges from about 2.5 to 50 mole percent, more preferably from about 25 to 50 mole percent, and most preferably, from about 40 to 50 mole percent of the addition polymer and the balance of the polymer is the ethylene-1,2-dicarboxylic acid or anhydride.

Terpolymers are presently preferred for use in the present invention. More preferred are an addition polymer of an ethylene-1,2-dicarboxylic acid or anhydride such as the most preferred maleic anhydride and (a) 1-decene with a $C_{20}$–$C_{24}$ 1-alkene blend, more preferably in a 40:60 to 60:40 mole ratio, and most preferably in a 50:50 mole ratio, or (b) 1-octadecene with a $C_{24}$–$C_{28}$ 1-alkene blend, more preferably in a 90:10 to 10:90 mole ratio and most preferably in a 20:80 mole ratio.

Examples of polymers of acrylic or methacrylic acid and other comonomers which may be useful in the compositions of the present invention include a polymer of 85 mole percent lauryl acrylate and 15 mole percent acrylic acid, a polymer of 95 mole percent lauryl acrylate and 5 mole percent acrylic acid, a polymer of 85 mole percent of an acrylate ester of a blend of long chain monoalcohols having from about 27 to 35 carbon atoms per molecule sold by Petrolite Specialty Polymers Group, Petrolite Corporation of Tulsa, Okla. under the designation "X5100" and 15 mole percent acrylic acid, a terpolymer of 80 mole percent of an acrylate ester of a blend of long chain monoalcohols having from about 45 to 53 carbon atoms per molecule sold by Petrolite under the designation "X5113", 15 mole percent acrylic acid, and 5 mole percent of an acrylate ester of a blend of polyethoxylated long chain monoalcohols having from about 35 to 43 carbon atoms per molecule sold by Petrolite under the designation "X5139", a polymer of 60 mole percent lauryl acrylate, 20 mole percent of Petrolite® X5113 monomer, 15% methacrylic acid and 5 mole percent of an ethoxylated nonylphenol acrylate sold under the designation "CD-504" by Sartomer Company, Inc. of West Chester, Pa., and a polymer of 85 mole percent of Petrolite® X5113, 10 mole percent of acrylic acid and 5 mole percent of SAM 211A from PPG Industries.

As described in the Billman et al. Patent above, the addition polymers may be modified by esterification of the carboxyl groups or anhydride groups present with substituted or unsubstituted monoalcohols having alkyl groups of from 1 to about 48 carbon atoms per molecule to produce half esters. Examples of such unsubstituted alcohols are methanol, ethanol, amyl alcohol, n-butanol, 2-butanol, cyclohexanol, benzyl alcohol, 2-ethylhexanol, isobutanol, isopropanol, methyl amyl alcohol, tetrahydrofurfuryl alcohol, 1-dodecanol, 1-hexadecanol, iso-stearyl alcohol, 1-eicosanol, 1-docosanol, 1-triacontanol, 1-hexatriacontanol and 1-octatetracontanol. The alkyl chain in the monoalcohol can help with solubilization of the polymer in the wax and any fatty acid or else with subsequent solubilization of the wax and any fatty acid in heated aqueous nearly neutral to alkaline pH solutions during the repulping process. Other possible substituted monoalcohols are alkoxylated hydroxyethers such as those of the formula $AO(CH_2CH_2O)_a(C_3H_6O)_bOH$ where A is R—, $RC_6H_5$—, RCO—, phenyl or benzyl where R is an alkyl radical of from 1 to 30 carbon atoms, a and b are each integers of from 0 to 30 where either or both of a and b is equal to at least 1 such as propylene glycol monomethyl ether, ethylene glycol monobutyl ether, ethylene glycol monohexyl ether, propylene glycol monobutyl ether, and diethylene glycol monobutyl ether, polyethoxylated nonylphenol containing from about 1 to 20 ethoxy groups per molecule. Obviously, use of monoalcohols that will soften the composition of the present invention too much or make it too water sensitive to be acceptable at the temperature of use must be avoided so the composition remains intact during the useful life of the coated or impregnated article.

The substituted monoalcohols may contain further functional groups such as sulfonate groups which do not react with the carboxyl groups present in the polymer, but provide desirable properties to the polymers used in the compositions of the present invention. An example of one such functional monoalcohol is isethionic acid (oxyethyl sulfonic acid).

Similarly, substituted and unsubstituted monoamino-functional compounds can be used to create amides and imides by reaction with the carboxyl groups present in the polymer. The substituted monoamino-functional compounds may contain further functional groups such as sulfonate groups that do not react with the carboxyl groups present in the polymer, but provide desirable properties to the polymers used in the compositions of the present invention. Examples of such unsubstituted amino-functional compounds are primary or secondary monoamines containing alkyl groups of from about 1 to about 30 carbon atoms per molecule such as methylamine, cyclohexylamine, isopropylamine, di-n-propyl amine, ethyl-n-butylamine, diamylamine, 2-ethylhexylamine, di(2-ethylhexyl)amine, n-octylamine, di-n-dodecylamine, n-octadecyl amine, di-n-decylamine, tallowamine, cocoamine, dicocoamine, oleylamine, and soyamine.

Examples of substituted monoamines with functional groups include compounds containing hydroxy, polyalkoxy or sulfonic acid groups in addition to amine groups and alkyl groups of from about 1 to about 30 carbon atoms such as taurine (aminoethyl sulfonic acid), n-methyl taurine, morpholine, and di(hydrogenated-tallow)amine. Further examples are polyalkoxylated ether amines of the formula $DO(CH_2CH(CH_3)O)_c(CH_2CH_2O)_dCH_2CH(CH_3)NH_2$ where D is an alkyl group of from 1 to about 12 and each of c and d can be 0 to about 32 where the total of c+d is from about 2 to 50 sold commercially under the trademark JEFFAMINE® by Texaco Chemical Company of Austin, Tex. such as JEFFAMINE® M-1000 where D is $CH_3O$—, and the ratio of c:d is 3:18 and the molecular weight is about 1000. Yet other examples of such monoamines with functional groups are the reaction products of aldehydes or ketones with bisulfite to produce an hydroxylamine followed by reaction of that hydroxylamine with a primary amine having from about 1 to about 20 carbon atoms to obtain a compound of the general formula $R^1NHCR^2R^3SO_3X$ where $R^1$ is an alkyl group of 1 to 20 carbons, and $R^2$ and $R^3$ are each hydrogen or alkyl groups of from about 1 to 4 carbons.

Commercial repulping operators prefer to use repulping solutions that are as near to being neutral or slightly alkaline in pH as possible (approximately 7.1 to about 8.5). It was found that by modifying the polymer with organo-functional compounds, monoamines or monoalcohols such as taurine provide compositions of the present invention that are water resistant at the normal temperatures of use for coated paper products. However, compositions of the present invention that contain such modified polymers provide coated or impregnated fibrous products that can be repulped in nearly neutral to slightly alkaline pH aqueous media at about or above 50° C. (depending upon the melting point of the polymer, wax and other ingredients in the composition) which is a significant advantage.

To provide such modified polymers, the polymers are subsequently modified by reacting from about 1 mole percent to about 90 mole percent, more preferably from about 5 mole percent to about 50 mole percent, and most preferably from about 10 mole percent to about 30 mole percent, of the total moles of carboxyl groups in the polymer with a monoalcohol or monoamine of the type described above. Only enough monoalcohol or monoamine is used to leave sufficient carboxyl groups to provide sensitivity to water to make the coated or impregnated fibrous products repulpable in heated slightly alkaline to nearly neutral pH aqueous media while still keeping the overall hot melt polymer/wax composition sufficiently water-resistant at the temperature of use.

The preparation of such modified polymers is well known in the art and forms no part of the present invention. For example, the preparation of taurine-modified polymers is described in U.S. Pat. Nos. 3,991,079 to Hoke, 4,317,893 to Chen et al., 4,588,786 to Kadono, and 4,618,450 to Higgins. Another method that can be used is the reaction of taurine with a maleic anhydride polymer of the type described above in the presence of about 1–2 moles of water per mole of anhydride group at about 150° C. in a pressurized reactor to induce opening of and reaction with the anhydride ring as will be further described in the Examples.

A third optional, but preferred, ingredient is up to about 77.5% such as from about 5% to about 77.5%, more preferably from about 5% to 60%, and most preferably, from about 10% to 40% by weight based upon the total weight of hot melt polymer/wax composition of at least one fatty acid selected from the group consisting of natural or synthetic fatty acids containing from about 12 to 48 carbon atoms. The fatty acid should be a solid at the expected temperature of use of the composition and contributes to the water repellency of the hot melt polymer/wax composition. However, in alkaline media, a water-dispersible soap is formed when the carboxyl group present in the fatty acid is neutralized and becomes hydrophilic. The resulting soap then assists in removing and dispersing the wax from the fibers during the repulping process. Best repulpability was obtained using a combination of a fatty acid such as stearic acid with the above-described polymers and wax. Use of too much fatty acid can have adverse effects on the coating by making it turn cloudy initially or when placed in contact with water and may lead to poor adhesion of the coating to the paper being coated. Use of too much fatty acid can also increase the coating pickup, increase foaming during repulping and increase the cost of the composition.

Other optional ingredients that may be present at about 5% by weight or less of the total composition include the higher melting point waxes noted above, pigments, preservatives, dyes, stress-cracking reduction agents such as ethylene-vinyl acetate copolymers, and other conventional additives commonly found in hot melt wax composition for fibrous products.

INDUSTRIAL APPLICABILITY

The compositions of the present invention are simple to produce. The wax, polymer, and any fatty acid to be used are charged to a mixing vessel equipped with a stirrer and heated to a temperature above the melting point of the highest melting ingredient, typically from about 75° C. to about 130° C., but less than that temperature at which the ingredients thermally degrade. Stirring is started when the ingredients are sufficiently fluid to permit stirring. The temperature is maintained and stirring is continued until the mixture is homogeneous. Other conventional optional ingredients may be added to the fluid mixture as is commonly done for hot melt coating compositions. When the mixture is homogeneous, it is then cooled and placed in a lined drum or pail for storage prior to use. The composition also can be maintained in a fluid state with continued heating for shipment or use shortly after preparation.

The hot melt polymer/wax compositions are applied using the same type of coating equipment as is conventionally used for hot melt wax coatings for paper-based products. This is one of the advantages of the compositions of the present invention.

For example, the compositions of the present invention may be heated until the composition is sufficiently fluid to be coated such as from about 50° C. to 130° C., more preferably from about 60° C. to 95° C. The composition is added to a reservoir in a conventional cascade or curtain coating machine for corrugated paper boxes that are placed on a moving conveyor belt in flat sheets form with their flutes (open ends) facing up. A cascade or wall of molten coating composition is flowed over the tops of the sheets so the fluid composition coats all sides of the sheets and also flows to some degree within the corrugations forming the interior of the corrugated paperboard sheets. After passing through the curtain of molten hot melt polymer/wax composition, the corrugated paperboard sheets pass through a cooler area while air is circulated around the coated sheets to cool the composition below its melting point and create a solid coating on the sheets. The coated sheets are then removed from the conveyor belt and stacked for assembly into corrugated paperboard shipping boxes. The remaining hot melt polymer/wax composition is captured after it passes over the sheets and is recirculated back over new sheets to form a continuous cascade coating process. Curtain coating machinery can also be used. Another alternative dip coating method for hot melt wax coatings is described in U.S. Pat. No. 4,668,536 to Goodell et al. noted above. Commercial coaters typically desire to have from about 30% to 80% coating pickup on the products being coated.

After use, the coated paper products can then be repulped essentially using conventional paper product repulping equipment and techniques involving the use of heated aqueous nearly neutral to alkaline pH repulping conditions. An inorganic or organic base such as sodium hydroxide, sodium carbonate, sodium bicarbonate, ammonia, disodium phosphate, borax and organic amines such as triethanolamine, isopropylamine or triethylamine may be used to provide alkalinity to the aqueous solution used in the repulping process with sodium hydroxide, sodium carbonate, sodium bicarbonate, and mixtures thereof being preferred. Bases having buffering capacity such as sodium carbonate and sodium bicarbonate are more preferred. The pH of the repulping media needed depends upon (a) the type and amount of base used, and (b) the type of hot melt polymer/wax composition of the present invention used. The advantage of using a base with buffering capacity is that the pH of the solution tends to remain relatively constant as long as the amount of base present is in excess of that required for neutralization of any acid or carboxyl groups present. As is well known, for bases with buffering capacity, the pH is characteristic of that particular base. For example, the pH of aqueous sodium carbonate is about 10–10.5 whereas that for aqueous sodium bicarbonate is about pH 8–8.5. Because of its lower pH value in solution, sodium bicarbonate tends to be less damaging to paper fibers than sodium carbonate, but the latter is a more cost effective base to use.

Polymers having shorter alkyl chain length monomers tend to have more solubility in water at lower levels of neutralization of the carboxyl groups present and can thus be repulped in lower pH (approximately 7.5 to 8.5) aqueous solutions. Modified polymers containing functional monoamines such as taurine reacted with some of the carboxyl groups present tend to be repulpable at pH values closer to 7 using deionized water than coating compositions based upon unmodified polymers. Some amount of neutralization is required to activate the carboxyl groups in the polymer and in any fatty acid present in the hot melt polymer/fatty acid composition to separate the coating from the paper fibers.

Similarly, products made by using the compositions of the present invention can be used as impregnating agents or binders to bind cellulosic fibers together by heating mixtures of the fibers and coating together to form molded products such as cartons and containers after cooling. Such cartons or containers can later be repulped in the same manner as described above for coated paper products.

Further information concerning other hot melt coatings and their evaluations can be found in a copending patent application which is being filed concurrently herewith and assigned to the same Assignee as is the present invention: a U.S. patent application entitled "Repulpable Hot Melt Polymer/Fatty Acid Compositions For Fibrous Products" filed Jul. 22, 1993, as U.S. Ser. No. 08/096,523 in the names of Paul E. Sandvick and Calvin J. Verbrugge, the same inventors as are named herein and now U.S. Pat. No. 5,491,190.

The following Examples are provided to show various aspects of the present invention without departing from the scope and spirit of the invention. Unless otherwise indicated, as with the polymers where the percentages of monomers used are expressed in mole percent, all other parts and percentages used in the following Examples are by weight. In the Examples, times are described where 3' means 3 minutes and 20" means 20 seconds; measurements are described where 5 in means 5 inches and 2 cm means 2 centimeters; weights are described where 10 g means 10 grams, 8 kg means 8 kilograms, and 4 lb. means 4 pounds; and volumes are described where 7 ml means 7 milliliters, 9 l means 9 liters, 16 oz means 16 fluid ounces, and 11 gal means 11 gallons. "Room temperature" is about 20° C. to 25° C.

Various ways of evaluating the water resistance of coated paper products have been developed. Sometimes the term "water repellency" is also used. For the purposes of this invention, "water-resistant" or "water-resistant coatings or compositions" shall mean a composition used as a coating which provides a fully-coated or impregnated fibrous product with sufficient resistance to water that the fibrous product's physical properties such as physical strength and fiber integrity are not significantly degraded after immersion in ice water (0° C.) for a one hour period. One measurement is to calculate the percent coated fibrous product sample weight change after immersion in ice water (0° C.) for a one hour period by weighing the coated fibrous product sample before and after coating, then weighing the coated fibrous product sample after immersion in water, calculating the difference in coated fibrous product sample weight before and after immersion, and dividing that difference by the uncoated fibrous product sample weight, and multiplying by 100 to get a percent weight change ("WATER IMMERSION TEST"). A desirable value of water absorption or weight gain by the WATER IMMERSION TEST is no more than about 10%, since above this value, the paper strength begins to deteriorate noticeably.

One measure of water-resistance which is not as stringent as the one hour immersion in ice water test is to simply place a drop of water on the surface of a coated paper article. This test was also used to evaluate the water sensitivity of repulped paper samples using the REPULPABILITY METHOD described below. The initial contact angle at room temperature of the water droplet is noted and the droplet is observed over a period of time. If the droplet was completely absorbed into the paper sample within a few seconds, that observation and the time it took to be absorbed was reported.

If the droplet was not absorbed quickly, a visual rating scale was used to describe the contact angle of the water droplet. A rating of "High" or "H" contact angle indicated that the droplet had a somewhat spherical shape when viewed from the side and its height was more than about one-half the height of a water droplet of the same volume on a completely water-resistant, hydrophobic surface. A rating of "Medium" or "M" contact angle was assigned where the droplet tended to spread out over the surface, but still retained a visibly hemispherical shape when viewed from the side and had a height almost about one half of the height of a water droplet of the same volume on a completely water-resistant, hydrophobic surface. A rating of "Low" or "L" contact angle was assigned where the droplet was not completely absorbed into the paper sample, but had essentially wetted the surface and had spread over the surface so the height of the droplet was less than about one-quarter of the height of a water droplet of the same volume on a completely water-resistant, hydrophobic surface ("WATER CONTACT ANGLE").

Various tests for measuring the repulpability of paper products exist. Some methods use high shear-type kitchen blenders which may not reproduce the conditions used in commercial repulping equipment. To try to duplicate more closely the conditions used in commercial repulping operations, the following procedure was used in some of the Examples as noted (hereinafter "REPULPING METHOD") with some modifications as to pH and the nature of the aqueous repulping solution as noted in the Examples.

The REPULPING METHOD uses samples of uncoated 3 in by 6 in (7.62 cm by 15.24 cm) 69 lb (31.3 kg) kraft paper liner board (i.e., 69 lb per 1000 square feet or 31.3 kg per 92.9 square meters) of about 0.02 in (0.05 cm) thickness weighing about 4 g ("PAPER BOARD") which is dip-coated in the molten hot melt polymer/wax composition to provide approximately 30–80% coating pickup weight if possible. The aqueous solution used for repulping is a 0.025 Molar ("0.025M") solution of sodium carbonate (anhydrous, 2.65 g per liter) at a pH of about 10.4 ("aqueous sodium carbonate solution").

The REPULPING METHOD involves the following steps:

1. Heat the aqueous sodium carbonate solution to 75° C.
2. The coated paper liner board sample is cut into chips measuring about 0.5 in by 0.5 in (1.27 cm by 1.27 cm).
3. The chips are added to 100 g of the heated sodium carbonate solution and mixed using a hand-held kitchen blender having a two-bladed propeller-type stirrer with blunt, non-cutting edges. Mixing is continued until the pulp in the mixture becomes uniform (usually in about two minutes). At this point, the mixture now contains about 4% paper fiber content.
4. Dilute the aqueous pulp from step 3 to 400 g with 75° C. aqueous sodium carbonate solution and mix an additional 30" with the hand-held blender while the temperature of the mixture is at 70° C.–75° C. The mixture now contains about 1% paper fiber content.
5. The mixture is then suction-filtered using a porcelain Buchner funnel containing a 60 mesh (U.S. Standard) stainless steel screen in place of filter paper. The aqueous filtrate is retained and the pH of the filtrate is recorded.
6. The pulp filter cake remaining on the screen in the Buchner funnel (weight approximately 15–19 g) is removed and diluted to 400 g using 75° C. aqueous sodium carbonate solution of the type described above and mixed for 15" with the hand-held mixer at 70° C.–75° C.
7. Step 5 is repeated again. The aqueous filtrate is retained and the pH of the filtrate is recorded.
8. The pulp filter cake remaining on the screen in the Buchner funnel (weight approximately 15–19 g) is removed and diluted to 400 g using deionized water at room temperature and mixed for 15" with the hand-held mixer.
9. One hundred grams of the aqueous pulp from step 8 is diluted to 300 g with deionized water at room temperature and mixed for 15" with the hand-held mixer. This mixture contains about 0.3% paper fiber content. The remaining paper pulp from step 8 is also retained separately.
10. The diluted paper pulp mixture from step 9 is filtered onto a screen as in step 5 to form a paper sheet. Suction is not started until after the pulp mixture has all been poured into the funnel. The aqueous filtrate is retained and its pH is recorded.
11. With the paper sheet still attached to the screen, the screen is removed from the Buchner funnel. A second screen of the same type is placed on top of the paper sheet. The screen/paper/screen assembly is placed between two paper towels.
12. A 1000 ml stainless steel metal beaker is used as a roller to squeeze the water from the screen/paper/screen assembly into the towels. This process is repeated until all excess water is removed.

13. The paper sheet is left attached to one of the screens and placed, screen side down, on a 16 oz (473 ml) metal jar lid placed on a hot plate at a setting of 3 (Corning® hot plate model no. PC-35, 600 watts). Alternatively, the paper sheet may be dried on the screen in an oven for 30' at 80° C. or as otherwise indicated in the following Examples. The drying method was found to affect the water sensitivity and permeability of the resulting paper sheet.

To test the water sensitivity of the paper sheet, a droplet of water is placed on the paper sheet obtained above. The time for the droplet of water to completely soak into the paper sheet is measured a total of two to twenty times. The average of the measurements is reported. If any one or more droplets take more than 25', then the observation is discontinued and the result is simply reported as greater than 25' ("WATER SOAK-IN TIME").

The efficiency of repulpability was measured by diluting 50 ml of aqueous pulp from Step 8 above to 500 ml with deionized water in a graduate cylinder. The mixture is swirled and visually observed for the presence of flakes of unpulped paper using a scale of none, slight, moderate, considerable and heavy ("REPULPABILITY EFFICIENCY").

The molecular weights of the polymers described below were determined by a high pressure liquid chromatographic method using polystyrene molecular weight standards to measure the number average molecular weight ("$M_n$") in daltons, the weight average molecular weight ("$M_w$") in daltons, the Z-average molecular weight ("$M_z$") in daltons, and viscosity average molecular weight ("$M_v$") in daltons.

The following ingredients were used in the Examples:

POLYMER A: An addition polymer of maleic anhydride and a mixture of 1-alkenes in about a 50:50 molar ratio of maleic anhydride to 1-alkenes where the 1-alkenes used were a blend of 20 moles of 1-octadecene and 80 moles of 1-alkenes having substantially from about 24 to 28 carbon atoms per molecule ("$C_{24}$-$C_{28}$ 1-alkenes"). The molecular weight values of Polymer A were: $M_n$—2,707 daltons; $M_w$—17,230 daltons; $M_z$—68,330 daltons and $M_v$—13,920 daltons.

POLYMER B: An addition polymer of maleic anhydride and a mixture of 1-alkenes in about a 50:50 molar ratio of maleic anhydride to 1-alkenes where the 1-alkenes used were a blend of 50 moles of 1-decene and 50 moles of $C_{24}$-$C_{28}$ 1-alkenes. The molecular weight values of Polymer B were: $M_n$—3,090 daltons; $M_w$—12,280 daltons; $M_z$—27,260 daltons and $M_v$—10,910 daltons.

POLYMER C: A polymer of the same composition as POLYMER A, but modified by heating the polymer in a pressurized reactor with a sufficient amount of taurine to react with 5 mole percent of the anhydride groups present in the polymer with stirring and adding 1 mole equivalent of water (based upon the total moles of maleic anhydride) to the mixture at 150° C. with stirring and thereafter heating to 150° C. and allowing the taurine to react with the carboxyl groups present in the polymer until a considerable portion of the taurine was reacted (60', 60 p.s.i.g. (0.41 megaPascal)).

POLYMER D: A polymer of the same composition as POLYMER A, but modified by heating the polymer, a sufficient amount of taurine to react with 5 mole percent of the anhydride groups present in the polymer, and 2 mole equivalents of water (based upon the total moles of maleic anhydride) in a pressurized reactor to 150° C. with stirring and allowing the taurine to react with the carboxyl groups present in the polymer until a considerable portion of the taurine was reacted (60', 90 p.s.i.g. (0.62 megaPascal)).

POLYMER E: A polymer of the same composition as POLYMER A, but modified by heating the polymer, a sufficient amount of taurine to react with 5 mole percent of the anhydride groups present in the polymer, and 2 mole equivalents of water (based upon the total moles of maleic anhydride) in a pressurized reactor to 150° C. with stirring and allowing the taurine to react with the carboxyl groups present in the polymer until a considerable portion of the taurine was reacted (60', 90 p.s.i.g. (0.62 megaPascal)).

POLYMER F: A polymer of the same composition as POLYMER A, but modified by heating the polymer, a sufficient amount of taurine to react with 10 mole percent of the anhydride groups present in the polymer, and 1 mole equivalent of water (based upon the total moles of maleic anhydride) to the mixture in a pressurized reactor to 150° C. with stirring and allowing the taurine to react with the carboxyl groups present in the polymer until a considerable portion of the taurine was reacted (90', 75 p.s.i.g. (0.52 megaPascal)).

POLYMER G: A polymer of the same composition as POLYMER A, but modified by heating the polymer, a sufficient amount of taurine to react with 10 mole percent of the anhydride groups present in the polymer, and 2 mole equivalents of water (based upon the total moles of maleic anhydride) to the mixture in a pressurized reactor to 150° C. with stirring and allowing the taurine to react with the carboxyl groups present in the polymer until a considerable portion of the taurine was reacted (90', 80 p.s.i.g. (0.55 megaPascal)).

POLYMER H: An addition polymer of maleic anhydride and a mixture of 1-alkenes in about a 50:50 molar ratio of maleic anhydride to 1-alkenes where the 1-alkenes used were a blend of 50 moles of 1-hexene and 50 moles of $C_{24}$-$C_{28}$ 1-alkenes. The molecular weight values of Polymer H were: $M_n$—2,611 daltons; $M_w$—16,450 daltons; $M_z$—315,800 daltons.

POLYMER I: An addition polymer of maleic anhydride and a mixture of 1-alkenes in about a 50:50 molar ratio of maleic anhydride to 1-alkenes where the 1-alkenes used were a blend of 20 moles of 1-hexene and 80 moles of 1-octadecene. The molecular weight values of Polymer I were: $M_n$—3,313 daltons; $M_w$—14,630 daltons; $M_z$—75,830 daltons.

POLYMER J: An addition polymer of maleic anhydride and a mixture of 1-alkenes in about a 50:50 molar ratio of maleic anhydride to 1-alkenes where the 1-alkenes used were a blend of 50 moles of 1-decene and 50 moles of $C_{20}$-$C_{24}$ 1-alkenes. The molecular weight values of Polymer J were: $M_n$—2,888 daltons; $M_w$—9,747 daltons; $M_z$—25,770 daltons.

POLYMER K: An addition polymer of maleic anhydride and a mixture of 1-alkenes in about a 50:50 molar ratio of maleic anhydride to 1-alkenes where the 1-alkenes used were a blend of 50 moles of 1-decene and 50 moles of $C_{20}$-$C_{24}$ 1-alkenes. The molecular weight values of Polymer K were: $M_n$—3,130 daltons; $M_w$—10,540 daltons; $M_z$—21,170 daltons and $M_v$— 9,540 daltons.

POLYMER L: An addition polymer of maleic anhydride and 1-octadecene in about a 50:50 mole ratio. The molecular weight values of Polymer L were: $M_n$—2,220 daltons; $M_w$—7,690 daltons; $M_z$—13,660 daltons and $M_v$—7,060 daltons.

POLYMER M: An addition polymer of maleic anhydride and a mixture of 1-alkenes in about a 50:50 molar ratio of maleic anhydride to 1-alkenes where the 1-alkenes used were a blend of 50 moles of 1-decene and 50 moles of $C_{20+}$ 1-alkenes (substantially composed of 1-alkenes of 20 or more carbon atoms. The molecular weight values of Polymer M were: $M_n$—3,580 daltons; $M_w$—11,660 daltons; $M_z$—23,920 daltons and $M_v$—10,520 daltons.

POLYMER N: An addition polymer of maleic anhydride and a mixture of 1-alkenes in about a 50:50 molar ratio of maleic anhydride to 1-alkenes where the 1-alkenes used were a blend of 20 moles of 1-decene and 80 moles of 1-octadecene. The molecular weight values of Polymer N were: $M_n$—3,270 daltons; $M_w$—10,700 daltons; $M_z$—21,600 daltons and $M_v$—9,680 daltons.

POLYMER O: An addition polymer of 31% acrylic acid, 36% styrene and 33% alpha-methyl styrene with $M_w$—1,800 daltons, an acid number of 230 milligrams of KOH per gram of polymer, and a ring and ball softening point of 110° C.

POLYMER P: An addition polymer of 50 moles of maleic anhydride and 50 moles of a mixture of styrene and 1-octadecene in about a 60:40 molar ratio. The polymer had $M_w$—6,300 daltons, an acid number of 254–280 milligrams of KOH per gram of polymer, and a ring and ball softening point of 120°–140° C.

Polymer Q: An addition polymer of ethylene and acrylic acid having an acid number of 120 milligrams of potassium hydroxide per gram of polymer, a softening point of 92° C., a hardness of the polymer of 11.5 dmm (ASTM D-5), a Brookfield Viscosity at 140° C. of 650 centipoise (0.65 pascal.seconds) and a density of 0.93 grams per cubic centimeter (ASTM D-1505) sold under the tradename AC-5120 by Allied Chemicals of Morristown, N.J. Based upon the reported acid number, the polymer had a weight ratio of 84.6:15.4 ethylene:acrylic acid (i.e., 154 grams of acrylic acid in 1,000 grams of total polymer).

Polymer R: An addition polymer nominally containing 85 weight percent of lauryl acrylate and 15 weight percent acrylic acid having the following molecular weight values: $M_n$ 2,230 daltons; $M_w$—5,620 daltons; $M_z$—12,350 daltons. The polymer as used had a nonvolatile solids content of 96.3% (after vacuum rotoevaporating a solution of the polymer in ISOPAR® G solvent at 70° C. under 5 microns pressure and thereafter drying the product overnight at 60° C.). This polymer was a liquid at room temperature.

Polymer S: An addition polymer composed of alternating units of maleic anhydride and n-octadecyl vinyl ether having a viscosity of 800 centipoise (0.8 pascal.seconds) maximum at 74° F. (23.33° C.), a specific viscosity (1 gram of polymer in 100 milliliters of toluene) of 0.1–0.16, and a nonvolatile solids content of 40% in toluene solvent obtained as GAN-TREZ® AN-8194 from GAF Chemicals Corporation, now known as International Specialty Products of Wayne, N.J. The polymer reportedly had a Mannheim Block softening point of 88° C. and a Flow Temperature (no pressure) of 125° C. Before use in the present invention, the GAN-TREZ® AN-8194 was subjected to vacuum rotoevaporation to remove the toluene solvent until the product was very thick and almost solid. This product was scraped out and a portion was cut into smaller pieces that were frozen in liquid nitrogen and pounded in a mortar to obtain small grains. The grains were dried in a 60° C. oven overnight to obtain a polymer having a nonvolatile solids content of 97.6%. That polymer was used in the Examples described below.

Polymer T: A 50:50 by weight blend of two different batches of addition polymers having the same chemical composition as Polymer J. One batch of polymer had the following molecular weight values: $M_n$ 3,218 daltons; $M_w$—66,780 daltons; $M_z$—5,394,000 daltons. The other batch had the following molecular weight values: $M_n$ 2,815 daltons; $M_w$—63,510 daltons; $M_z$—4,951,000 daltons.

In the Examples below, the stearic acid was EMERSOL® 132 from Henkel Corp./Emery Division of Cincinnati, Ohio.

Likewise, in the Examples, "PARAFFIN A" was paraffin wax with a melting point between 51° C. and 53° C. and "PARAFFIN B" was paraffin wax with a melting point between 55.6° C. and 56.7° C.

It should be noted that the hydrophilicity of the repulped paper or fibrous article is not the only criteria for evaluating the repulpability of the coated products. While hydrophilicity is desirable, good repulpability exists if (1) good fiber separation is obtained in the pulp with little or no evidence of unpulped paper flakes remaining, (2) there is little or no tendency of the separated fibers to clump together in the diluted pulp, (3) paper formed is uniform and clean in appearance with little evidence of greasy or oily spots and imperfections due to unrepulped flakes, and (4) the equipment used to conduct repulping is reasonably free of insoluble deposits of the composition used to coat the articles being repulped For example, repulped fibrous articles which are hydrophobic on the surface could still be used in making articles where some water resistance is desirable.

EXAMPLES 1–14

These Examples illustrate various coating compositions as described in Table I as well as an uncoated PAPER BOARD included as a control (Example 1). Examples 3–14 were made by heating the ingredients to 125° C. and stirring the ingredients until the composition became uniformly mixed. Each resulting composition was poured into an aluminum foil-lined tray to cool. Later, each composition was melted to dip coat both sides of PAPER BOARDS in 70°–75° C. bath of the composition ("DIP COATING").

The uncoated and coated PAPER BOARDS were subjected to the REPULPING METHOD. The water resistance of paper made from the repulped coated and uncoated PAPER BOARDS was measured by the water drop method after drying on a hot plate as described above and is reported in Table I. Examples 1 and 2 were comparative examples used as controls for the repulping evaluation. Examples 3 and 6 were comparative Examples illustrating alternative hot melt wax/fatty acid compositions. Example 11 is a comparative Example showing the use of a very small amount of polymer. The polymer gave improved coating film properties and adhesion to the paper substrate coated.

TABLE I

| Ex. | PARAFFIN A (%) | Stearic Acid (%) | POLYMER (%)[1] | Coating Pickup[2] (%) | WATER SOAK-IN TIME (WATER CONTACT ANGLE)[3] |
|---|---|---|---|---|---|
| 1 | 0 | 0 | 0 | No Coating | Immediately Absorbed (none) |
| 2 | 100 | 0 | 0 | 52.5 | >25' (H) |
| 3 | 90 | 10 | 0 | 57.5 | Center: 3" (L); Edges: >25' (H) |
| 4 | 90 | 0 | 10 (A) | 57.5 | >25' (H) |
| 5 | 80 | 10 | 10 (A) | 57.9 | >25' (H) |
| 6 | 70 | 30 | 0 | 53.8 | >25' (H) |
| 7 | 70 | 0 | 30 (A) | 60 | >25' (H) |
| 8 | 25 | 71.25 | 3.75 (A) | 60.5 | Center: 32" (L); Edges: 3', 46" (M) |
| 9 | 25 | 3.75 | 71.25 (A) | 223[4] | Center: 135" to 9' (M); Edges: >25' (H) |
| 10 | 60 | 20 | 20 (A) | 65 | Center: 3" (L); Edges: >25' (H) |
| 11 | 95 | 4.75 | 0.25 (A) | 52.5 | >25' (H) |
| 12 | 95 | 0.25 | 4.75 (A) | 55 | >25' (H) |
| 13 | 75 | 12.5 | 12.5 (A) | 57.5 | Center: 1" (L); Edges: >25' (H) |

TABLE I-continued

| Ex. | PAR-AFFIN A (%) | Stearic Acid (%) | POLYMER (%)[1] | Coating Pickup[2] (%) | WATER SOAK-IN TIME (WATER CONTACT ANGLE)[3] |
|---|---|---|---|---|---|
| 14 | 75 | 12.5 | 12.5 (B) | 60 | One measurement: 5"; 5 measurements: >25' |

[1] In this and the following Tables, the first entry is the amount and the parenthetical indicates which POLYMER.
[2] In this and the following Tables, percentage weight increase of a sample of PAPER BOARD (described above) after coating, i.e., coated weight minus the initial weight of the PAPER BOARD, all divided by the initial weight of the PAPER BOARD and multiplied by 100.
[3] After drying the paper sheet on a hot plate as described in Step 13 of the REPULPING METHOD. The parenthetical reports the water contact angle as H = high; M = medium and L = low. The time values reported are an average of at least two and up to seven measurements.
[4] Coating was very viscous causing excessive coating deposition.

For Example 1, the WATER IMMERSION TEST (no coating present) results for uncoated PAPER BOARD were 66.1% and 78%, respectively, in weight gain for the two samples tested. Each of the PAPER BOARD samples coated with Examples 2–14 rendered the PAPER BOARD hydrophobic and resistant to water although the WATER IMMERSION TEST was not run on these samples.

During the repulping process, the pH of the filtrate for each sample averaged between 10 and 11 for each of the first three washes.

REPULPABILITY EFFICIENCY: The "slight" presence of unpulped flakes was only noted for Example 12. Examples 8, 9, 11, and 14 were noted as having "very slight" presence of flakes. No flakes were noted in any of the other Examples.

In many cases, the repulped paper made using compositions of the present invention that were dried on a hot plate appeared to be hydrophobic. However, it was believed that very little hydrophobic material was present in the repulped paper samples based upon measurements done on repulped papers using coatings of similar compositions. It was thought that drying at high temperature on a hot plate might cause any hydrophobic material present to melt and bloom to the surface or spread over the entire repulped paper sample and give the paper surface a more hydrophobic appearance than it actually possesses. This drying method is not one which is used commercially, but is sometimes used for laboratory evaluation of paper samples which had not been rendered water resistant. However, conventional hot melt wax compositions are not considered repulpable. Thus, repulped papers from compositions of the present invention may not lend themselves to evaluations using conventional laboratory methods developed for repulped papers made from hydrophilic, uncoated paper samples.

To evaluate this, the pulp obtained after repulping PAPER BOARD coated with the composition of Example 8—contained a low amount of wax and a large amount of water dispersible fatty acid—was dried five different ways to produce eight paper samples (Examples 8A through 8H). The WATER SOAK-IN TIME and WATER CONTACT ANGLE of each was evaluated and is reported in TABLE II. Examples 8A–8F were dried in an oven at 40° C. and 80° C. Examples 8G and 8H were dried at room temperature. All heat-dried repulped paper samples were allowed to cool at least 10' at room temperature before performing the WATER CONTACT ANGLE and WATER SOAK-IN tests.

TABLE II

| Ex. | Weight of Repulped Paper (g) | Dry Time (min) | Drying Temp. (°C.) | WATER CONTACT ANGLE[1] | WATER SOAK-IN TIME |
|---|---|---|---|---|---|
| 8A | 0.92 | 45 | 40 | M | 15" |
| 8B | 0.79 | 45 | 40 | M | 12.3" |
| 8C | 0.79 | 90 | 40 | M | 15.7" |
| 8D | 0.89 | 30 | 80 | 1-H; 5-M | >25' |
| 8E | 1.01 | 30 | 80 | 2-H; 4-M | >25' |
| 8F | 0.73 | 60 | 80 | 3-H; 3-M | 5->25'; 1–390" |
| 8G | 0.87 | 210 | R.T. | M | 3.8" |
| 8H | 0.62 | 210 | R.T. | 5-M; 1-L | 3" |

R.T. = Room Temperature
[1] In this and the following Tables, six measurements were made per sample. Where some were different from others, the number of samples for each value is reported.

Higher drying temperatures tended to produce paper samples that exhibited higher water contact angles and longer water soak-in times in spite of the low amount of wax in the coating composition. Examples D–F did absorb water subsequent to the initial 25 minute observation time. The water contact angles were reduced to medium to low at that time.

Therefore, it is believed that repulped paper samples made from paper products coated with compositions of the present invention could be used satisfactorily for production of recycled paper products such as corrugated paper boxes under suitable drying conditions.

EXAMPLES 15–20

These Examples demonstrate the use of modified polymers in compositions of the present invention. Repulpability was tested using aqueous sodium carbonate and aqueous sodium bicarbonate as different repulping media. For comparative purposes, a composition consisting only of modified polymer as a coating was also included as Example 20.

Table III reports the compositions used and the coating pickup on the PAPER BOARD.

TABLE III

| Ex. | PARAFFIN A (%) | Stearic Acid (%) | POLYMER (%) | Coating Pickup (%) |
|---|---|---|---|---|
| 15 | 60 | 20 | 20 (C) | 61.5 |
| 16 | 60 | 20 | 20 (D) | 64.1 |
| 17 | 60 | 20 | 20 (E) | 62.5 |
| 18 | 60 | 20 | 20 (F) | 60.0 |
| 19 | 60 | 20 | 20 (G) | 62.5 |
| 20 | 0 | 0 | 100 (F) | 33.3[1] |

[1] Due to high viscosity at 115° C., the original coating pickup was unacceptably high. Thus, 2.8 g of coating was dissolved in 10 g of heptane and coated onto a heptane soaked PAPER BOARD to permit water resistance and repulpability to be measured on a PAPER BOARD with a lower coating pickup.

The Examples followed by an "A" or "B" designation in Table IV reports the results of subjecting the coated PAPER BOARDS described in Table III to the REPULPING METHOD using two different drying methods. The pH values for the three wash (repulping) solutions used in the REPULPING METHOD for these Examples was between 10.2 and 11.1.

TABLE IV

| Ex. | Weight of Paper (g) | Dry Time (min) | Drying Temp. (°C.) | WATER CONTACT ANGLE | WATER SOAK-IN TIME |
|---|---|---|---|---|---|
| 15A | 0.80 | 45 | 40 | M | 43" |
| 15B | 1.0 | ⁻16 hr | R.T. | 3-M; 3-L | 3" |
| 16A | 0.74 | 45 | 40 | M | 13.5" |
| 16B | 1.0 | ⁻16 hr | R.T. | M | 9" |
| 17A | 0.82 | 45 | 40 | 4-M; 2-L | 90" |
| 17B | 0.91 | ⁻16 hr | R.T. | M | 19" |
| 18A | 0.83 | 45 | 40 | M | 31" |
| 18B | 1.2 | ⁻16 hr | R.T. | 4-M; 2-L | 24.5" |
| 19A | 0.73 | 45 | 40 | 4-M; 2-L | 6" |
| 19B | 0.78 | ⁻16 hr | R.T. | M | 5" |
| 20A | 0.80 | 45 | 40 | M | 7.5" |
| 20B | 0.86 | ⁻16 hr | R.T. | M | 8" |

R.T. = Room Temperature

All coated PAPER BOARD samples were water-resistant. As can be seen from Table IV, the repulped paper samples were all sufficiently hydrophilic to allow absorption of water into the paper rather quickly with the exception of Example 17A which averaged 90".

Repulped coated PAPER BOARD from Examples 15–19 were also dried at 80° C. for 30' and exhibited High WATER CONTACT ANGLES and WATER SOAK-IN TIME values of greater than 25'. This shows that the drying temperature of the repulped paper sample has a significant effect on the hydrophobicity of the paper made by repulping.

Example 20 contained no wax and the repulped paper was hydrophilic as reported in Table IV. Repulped coated PAPER BOARD from Example 20 was also dried at 80° C. for 30' and exhibited 5 Medium and 1 Low WATER CONTACT ANGLES and WATER SOAK-IN TIME values of 3' and 5". The absence of the wax has a significant effect on the WATER SOAK-IN TIME after 30' at 80° C. which was much lower than the values obtained for Examples 15–19 which contained wax. Thus, it appears that any residual wax left on the repulped fibers may be spread throughout the paper sample at 80° C. (i.e., above the melting point of the wax) and thus gives the paper the appearance of being more hydrophobic.

Examples 15–19 were used to coat additional samples of PAPER BOARD where the coating pickup values were Ex. 15–17=65%; Ex. 18=60% and Example 19=59%. The above samples of coated PAPER BOARD were repulped into paper using a modification of the REPULPING METHOD. The REPULPING METHOD was followed up through Step 12, except that 2.65 g of sodium bicarbonate per liter of water was substituted for the sodium carbonate to obtain a lower pH aqueous repulping medium. The pH values for the first three wash solutions used in this modified REPULPING METHOD for these Examples were between 8.2 and 9.3. The results of the repulping are summarized in Table V.

Examples followed by an "E", "F" or "G" designation in Table V were repulped using the REPULPING METHOD, but substituting deionized water for the aqueous sodium carbonate solution to repulp the coated PAPER BOARD under nearly neutral pH conditions. The repulped paper was then dried under three different conditions. The pH values for the first three wash solutions used in the REPULPING METHOD for these Examples was as follows. For Examples 18E1, 18F1 and 18G1, the first wash pH reading was 5.63, the second wash was 6.27 and the third wash was 7.27 although the readings were noted as being unstable. For Examples 18E2, 18F2 and 18G2, the first wash was a semi-opaque emulsion with an average pH reading of 7.66 although the readings were noted as being unstable. After standing overnight at room temperature, the first wash for Examples 18E2, 18F2 and 18G2 had a layer of coating floating on the top of the emulsion. The paper of Example 18E1 had a slight bleeding of the water drop into the paper and Example 18F1 had spotting resembling grease spots after drying.

TABLE V

| Ex. | Weight of Paper (g) | Dry Time (min) | Drying Temp. (°C.) | WATER CONTACT ANGLE | WATER SOAK-IN TIME |
|---|---|---|---|---|---|
| 15C | 0.87 | 45 | 40 | M | 7" |
| 15D | 0.82 | ⁻16 hr | R.T. | L | 3' |
| 16C | 1.0 | 45 | 40 | M | 3" |
| 16D | 0.82 | ⁻16 hr | R.T. | 4-M; 2-L | 5" |
| 17C | 0.97 | 45 | 40 | 4-M; 2-L | 9" |
| 17D | NR | ⁻16 hr | R.T. | M | 12" |
| 18C | 0.84 | 45 | 40 | 5-M; 1-L | 9" |
| 18D | NR | ⁻16 hr | R.T. | M | 3" |
| 19C | 0.74 | 45 | 40 | 1-M; 5-L | 4" |
| 19D | NR | ⁻16 hr | R.T. | M | 5" |
| 18E1 | 0.89 | 45 | 40 | 6-H | >25' |
| 18F1 | 0.98 | 30 | 80 | 6-H | >25' |
| 18G1 | 0.89 | ⁻16 hr | R.T. | 6-H | >25' |
| 18E2 | 0.79 | 45 | 40 | 6-H | >25' |
| 18F2 | 0.87 | 30 | 80 | 6-H | >25' |
| 18G2 | 0.85 | ⁻16 hr | R.T. | 6-L | >25' |

NR = Not Recorded
R.T. = Room Temperature

All coated PAPER BOARD samples were water-resistant. As can be seen from Table V, the repulped paper samples for the "C" and "D" examples were all sufficiently hydrophilic to allow absorption of water into the paper rather quickly. Repulped paper from the "C" and "D" examples were also dried at 80° C. for 30' and exhibited High WATER CONTACT ANGLES and WATER SOAK-IN TIME values of greater than 25'.

It was noted that the WATER CONTACT ANGLE reading for Example 18G2, repulped in deionized water, was Low after drying overnight at room temperature suggesting that the coated PAPER BOARD could be repulped at nearly neutral pH to remove a significant amount of the coating even though the WATER SOAK-IN TIME was greater than 25 minutes.

EXAMPLES 21–23

These Examples illustrate various hot melt wax compositions made from different types of polymers as described in Table VI. Each was made by heating the ingredients to 125° C. and stirring the ingredients until the composition became uniformly mixed. Each resulting composition was poured into an aluminum foil-lined tray to cool until it was applied to PAPER BOARDS by DIP COATING.

TABLE VI

| Ex. | PARAFFIN A (%) | Stearic Acid (%) | POLYMER (%) |
|---|---|---|---|
| 21 | 60 | 20 | 20 (H) |
| 22 | 60 | 20 | 20 (I) |

TABLE VI-continued

| Ex. | PARAFFIN A (%) | Stearic Acid (%) | POLYMER (%) |
|---|---|---|---|
| 23 | 60 | 20 | 20 (J) |

Small pieces of corrugated paper were also coated with each of the compositions of Examples 21–23 to test for water resistance. Each coated piece of corrugated paper had a transparent, uniform coating of the composition. Each sample visually exhibited a High WATER CONTACT ANGLE and the water drop placed on each coated sample was not absorbed into the coated sample after two hours of contact with the surface at room temperature.

The repulpability of the coated PAPER BOARD samples was tested using the modified REPULPING METHOD described in the preceding Examples where aqueous sodium bicarbonate was used as the repulping medium instead of aqueous sodium carbonate. The pH of the first wash for each sample was from 7.68 to 8.03, the second wash ranged between 8.77 and 8.92 and the third sample ranged from 8.65 to 9.31 although the pH reading of the last wash was somewhat unstable. The results are described in Table VII.

TABLE VII

| Ex. | Weight of Paper (g) | Dry Time (min) | Drying Temp. (°C.) | WATER CONTACT ANGLE | WATER SOAK-IN TIME |
|---|---|---|---|---|---|
| 21A | 0.93 | 45 | 40 | 3-H; 2-M; 1-L | 2', 54" |
| 21B | 0.77 | 30 | 80 | H | >25' |
| 22A | 0.71 | 45 | 40 | M | 13" |
| 22B | 0.85 | 30 | 80 | H | >25' |
| 23A | 0.98 | 45 | 40 | 5-M; 1-L | 9" |
| 23B | 0.95 | 30 | 80 | H | >25' |

Examples 21B and 23B exhibited spots on parts of the repulped paper that appeared to be from particles of coating composition that were not entirely removed during the repulping process. The repulped paper samples for Examples 22A and 23A were quite hydrophilic when dried at the lower temperature of 40° C. while Example 21A was more hydrophobic than the other two samples at that drying temperature. All three repulped paper samples dried at 80° C. had hydrophobic surfaces and the water drop was not absorbed into the paper within 25'.

EXAMPLES 24–45

These Examples demonstrate the use of differing amounts of paraffin, stearic acid and polymer as well as the effect of different polymers on the repulpability of coated PAPER BOARD samples. The compositions are described in Table VIII. They were made by heating the ingredients to 125° C. and stirring the ingredients until the composition became uniformly mixed. Each resulting composition was poured into an aluminum foil-lined tray to cool until it was later applied to PAPER BOARDS by DIP COATING. The Examples with polymer were noted as being viscous at the coating temperature which resulted in higher coating pickup values.

TABLE VIII

| Ex. | PARAFFIN A (%) | Stearic Acid (%) | POLYMER (%) | Coating Pickup (%) |
|---|---|---|---|---|
| 24 | 40 | 20 | 40 (J) | 180 |
| 25 | 40 | 20 | 40 (I) | 248 |
| 26 | 40 | 20 | 40 (H) | 160 |
| 27 | 40 | 40 | 20 (J) | 67.5 |
| 28 | 40 | 40 | 20 (I) | 77.5 |
| 29 | 40 | 40 | 20 (H) | 65 |
| 30 | 20 | 40 | 40 (J) | 165 |
| 31 | 20 | 40 | 40 (I) | 127.5 |
| 32 | 20 | 40 | 40 (H) | 118 |
| 33 | 20 | 60 | 20 (J) | 72.5 |
| 34 | 20 | 60 | 20 (I) | 80 |
| 35 | 20 | 60 | 20 (H) | 67.5 |
| 36 | 20 | 70 | 10 (J) | 67.5 |
| 37 | 20 | 75 | 5 (J) | 65 |
| 38 | 24 | 72 | 24 (B) | 77.5 |
| 39 | 20 | 60 | 20 (K) | 75 |
| 40 | 20 | 60 | 20 (L) | 67.5 |
| 41 | 20 | 60 | 20 (M) | 67.5 |
| 42 | 20 | 60 | 20 (N) | 77.5 |
| 43 | 25 | 55 | 20 (J) | 72.5 |
| 44 | 25 | 55 | 20 (L) | 57.5 |
| 45 | 25 | 55 | 20 (M) | 72.5 |

The repulpability of the coated PAPER BOARD samples was tested using the modified REPULPING METHOD described in the preceding Examples 15–19 where aqueous sodium bicarbonate was used as the repulping medium instead of aqueous sodium carbonate. The pH of the first wash for each sample was from 6.87 to 7.97, the second wash ranged between 7.97 and 9.11 and the third sample ranged from 8.39 to 9.43 although the pH reading of some of the last washes for some samples was somewhat unstable. The results are described in Table IX.

TABLE IX

| Ex. | Weight of Paper (g) | Dry Time (min) | Drying Temp. (°C.) | WATER CONTACT ANGLE | WATER SOAK-IN TIME |
|---|---|---|---|---|---|
| 24A | 1.0 | 45 | 40 | 4-M; 2-L | 43" |
| 24B | 0.93 | 30 | 80 | H | >25' |
| 25A | 0.97 | 45 | 40 | M | 12', 21" |
| 25B | 0.95 | 30 | 80 | H | >25' |
| 26A | 0.94 | 45 | 40 | M | 7" |
| 26B | 0.85 | 30 | 80 | H | >25' |
| 27A | 0.90 | 45 | 40 | L | 4" |
| 27B | 1.0 | 30 | 80 | 4-M; 2-L | >25' |
| 28A | 0.92 | 45 | 40 | M | 5.5" |
| 28B | 0.86 | 30 | 80 | 4-H; 2-M | >25' |
| 29A | 0.96 | 45 | 40 | L | 5" |
| 29B | 0.84 | 30 | 80 | 3-M; 3-L | >25' |
| 30A | 0.90 | 45 | 40 | M | 1', 14" |
| 30B | 0.88 | 30 | 80 | M | >25' |
| 31A | 0.98 | 45 | 40 | M | 41" |
| 31B | 0.80 | 30 | 80 | H | >25' |
| 32A | 0.98 | 45 | 40 | M | 34" |
| 32B | 0.91 | 30 | 80 | 4-H; 2-M | >25' |
| 33A | 0.72 | 45 | 40 | L | 2.5" |
| 33B | 0.79 | 30 | 80 | 2-M; 4-L | 2', 2" |
| 34A | 1.1 | 45 | 40 | M | 1', 6" |
| 34B | 0.80 | 30 | 80 | 2-H; 4-M | >25' |
| 35A | 0.80 | 45 | 40 | L | 29" |
| 35B | 0.83 | 30 | 80 | 3-H; 3-M | >25' |
| 36A | 0.85 | 45 | 40 | 4-M; 2-L | 5" |
| 36B | 0.82 | 30 | 80 | 1-M; 5-L | 6', 31" |
| 37A | 0.99 | 45 | 40 | M | 22" |
| 37B | 0.82 | 30 | 80 | 3-M; 3-L | 8', 48" |
| 38A | 0.70 | 45 | 40 | L | 14" |
| 38B | 1.15 | 30 | 80 | 4-M; 2-L | 10', 47" |
| 39A | 1.01 | 45 | 40 | L | 14" |
| 39B | 0.86 | 30 | 80 | 2-M; 4-L | 8', 16" |

TABLE IX-continued

| Ex. | Weight of Paper (g) | Dry Time (min) | Drying Temp. (°C.) | WATER CONTACT ANGLE | WATER SOAK-IN TIME |
|---|---|---|---|---|---|
| 40A | 0.59 | 45 | 40 | L | 7" |
| 40B | 0.91 | 30 | 80 | 3-M; 3-L | >25' |
| 41A | 0.99 | 45 | 40 | L | 10" |
| 41B | 0.96 | 30 | 80 | 1-M; 5-L | 5', 31" |
| 42A | 0.92 | 45 | 40 | L | 21" |
| 42B | 0.76 | 30 | 80 | 1-M; 5-L | 14', 37" |
| 43A | 0.98 | 45 | 40 | 3-M; 3-L | 22" |
| 43B | 0.81 | 30 | 80 | 3-M; 3-L | >25' |
| 44A | 0.92 | 45 | 40 | L | 21" |
| 44B | 0.79 | 30 | 80 | 4-M; 2-L | 12', 58" |
| 45A | 0.98 | 45 | 40 | L | 14" |
| 45B | 0.87 | 30 | 80 | 1-H; 5-M | 12', 48" |

All of the repulped paper samples dried at 40° C. exhibited a hydrophilic surface which allowed the water droplet to be absorbed in less than 25 minutes at room temperature. Examples 33B, 36B–39B, 41B–42B and 44B–45B all exhibited a somewhat hydrophilic surface.

Examples 24B, 25B, 26B, 32B and 34B contained some spots of what appeared to be wax left on the paper while Examples 25A and 35B contained a very slight amount of such spots. Examples 27B and 35B absorbed much of the water drop after being in contact with the coated paper more than 25' at room temperature. Examples 28B, 29B and 34B had moderate and medium absorption of the water drop after being in contact with the coated paper more than 25' at room temperature. Examples 30B, 31B and 32B had a small amount of absorption of the water drop after being in contact with the coated paper more than 25' at room temperature. This absorption of water over a period of time seems to indicate that the underlying paper was somewhat hydrophilic and capable of being wetted by water although the paper surface initially appeared hydrophobic.

The water resistance of coated samples of PAPER BOARD was tested for Examples 27–29, 33–34 and 36–45 by soaking the coated samples in aqueous ice slush for one hour and determining the water pickup of the sample. The coated samples were found to be water-resistant in that in many cases very little water was absorbed by the samples tested and in all cases, less than 8% water was absorbed as reported in Table X. A desirable value of water absorption by the WATER IMMERSION TEST is no more than about 10%. The water gain by the WATER IMMERSION TEST for uncoated PAPER BOARD in Example 1 was 66.1% and 78%, respectively, for two samples.

TABLE X

| Ex. | Coating Pickup (%) | WATER IMMERSION TEST (%) |
|---|---|---|
| 27 | 69 | 1.08 |
| 28 | 72.5 | 0.47 |
| 29 | 70 | 0.76 |
| 33 | 80 | 2.32 |
| 34 | 80 | 2.76 |
| 36 | 70 | 7.87 |
| 37 | 67.5 | 6.97 |
| 38 | 62.5 | 1.12 |
| 39 | 72.5 | 4.16 |
| 40 | 67.5 | 6.12 |
| 41 | 70 | 3.43 |
| 42 | 72.5 | 4.69 |
| 43 | 65 | 5.15 |
| 44 | 75 | 5.14 |
| 45 | 70 | 0.51 |

Examples 27–29 and 33–34 were repulped using a modification of the REPULPING METHOD wherein the method was followed through Step 12, except that deionized water was used in place of the aqueous sodium carbonate solution. It was found that tap water containing some dissolved mineral content was unsuitable for repulping. The presence of the ions interfered with the repulping process and thus deionized water was preferred when no alkaline material was used in the repulping medium. The pH of the first wash for each sample was from 4.59 to 5.67, the second wash ranged between 5.79 and 6.75 and the third sample ranged from 5.75 to 7.12. The pH reading of all of the washes was somewhat unstable. The results of the repulping are reported in Table XI. As to REPULPABILITY EFFICIENCY, all five of the pulp samples obtained contained a considerable amount of flakes of unpulped paper. Only Examples 27D–29D and 33D–34D exhibited spotting on the dried repulped paper apparently due to particles of coating composition present in the pulp which were melted during the 80° C. drying step. The water drop placed on Example 33C was very slightly absorbed into the repulped paper sample after more than 25' of contact at room temperature while the rest of the repulped paper samples remained hydrophobic and did not absorb a water drop at all. Examples 27C, 27D, 28C and 28D were slightly sticky on the screen during repulping. Examples 29C and 29D had a moderate amount of stickiness on the screen during repulping.

TABLE XI

| Ex. | Weight of Paper (g) | Dry Time (min) | Drying Temp. (°C.) | WATER CONTACT ANGLE | WATER SOAK-IN TIME |
|---|---|---|---|---|---|
| 27C | 1.02 | 45 | 40 | H | >25' |
| 27D | 0.82 | 30 | 80 | H | >25' |
| 28C | 0.97 | 45 | 40 | H | >25' |
| 28D | 0.95 | 30 | 80 | H | >25' |
| 29C | 0.90 | 45 | 40 | H | >25' |
| 29D | 0.93 | 30 | 80 | H | >25' |
| 33C | 0.93 | 45 | 40 | H | >25' |
| 33D | 0.78 | 30 | 80 | H | >25' |
| 34C | 0.83 | 45 | 40 | H | >25' |
| 34D | 0.86 | 30 | 80 | H | >25' |

Although all samples repulped in deionized water had hydrophobic surfaces, the fact that most of the coating had been removed without subjecting the coated samples to a significantly alkaline repulping medium is remarkable in itself. As shown in Table X, the coated samples were water resistant. Thus, coatings are provided by this invention which can render paper articles water resistant, but can be removed to recover the paper pulp simply by using a deionized water repulping medium at an elevated temperature.

EXAMPLES 46–50

These Examples 46–49 exhibit the use of fatty acids other than stearic acid in compositions of the present invention. Example 50 is a comparative example showing the use of 100% stearic acid as a coating.

Example 46 used lauric acid sold as EMERY™ 652 by Henkel Corporation/Emery Group of Ambler, Pa. Examples 47-48 used a blend of straight chain fatty acids with an average carbon chain length in the range of $C_{40}$ to $C_{48}$ having a number average molecular weight of 700 (determined by vapor pressure osmometry), a melting point of 110° C., a viscosity of 15 centipoise (0.015 pascal.seconds) at 149° C., and an acid number of 58 milligrams of KOH per gram of sample. That blend is sold as UNICID™ 700 by Petrolite Specialty Polymers Group of Tulsa, Okla. Example 49 used a mixture of 10% stearic acid, 88% arachidic/behenic fatty acids (20 and 22 carbon atoms per molecule, respectively), and 2% oleic acid sold under the tradename HYSTRENE® 9022 Fatty Acid by the Humko Chemical Division of Witco Corporation, Memphis, Tenn. The compositions used are described in Table XII.

TABLE XII

| Ex. | Paraffin[1] (%) | Fatty Acid (%) | POLYMER (%) | Coating Pickup (%) |
|---|---|---|---|---|
| 46 | 60 | 20 | 20 (J) | 75 |
| 47 | 60 | 20 | 20 (J) | 39.5[2] |
| 48 | 75 | 5 | 20 (J) | 77.5 |
| 49 | 60 | 20 | 20 (B) | 57.9 |
| 50 | 0 | 100 | 0 | 72.5 |

[1]PARAFFIN A was used for Examples 46-48 and 50, PARAFFIN B was used for Example 49.
[2]Due to high viscosity at 115° C., the original coating pickup was 130% and 230%. Thus, 2.8 g of coating was dissolved in 10 g of heptane and coated onto a heptane soaked PAPER BOARD to permit water resistance and repulpability to be measured on a PAPER BOARD with a lower coating pickup.

These compositions were coated on PAPER BOARD by DIP COATING (except for Examples 47-48), repulped using the modified REPULPING METHOD which used aqueous sodium bicarbonate as the repulping medium, and evaluated as described in Examples 24-25. Due to the high melting point of the UNICID™ 700, the coating of Examples 47-48 had to be done at 115° C. unless the coating was done from a solvent solution. In the absence of solvent, Example 47 had a high degree of coating pickup because of its viscosity at 115° C. Thus, Example 48 was formulated to reduce the viscosity of the composition by using more paraffin and less UNICID™ 700 in the formulation.

The results of repulping the coated samples are found in Table XIII.

TABLE XIII

| Ex. | Weight of Paper (g) | Dry Time (min) | Drying Temp. (°C.) | WATER CONTACT ANGLE | WATER SOAK-IN TIME |
|---|---|---|---|---|---|
| 46A | 0.91 | 45 | 40 | 1-H; 1-M; 4-L | >25' |
| 46B | 0.64 | 30 | 80 | H | >25' |
| 47A | 0.90 | 45 | 40 | H | >25' |
| 47B | 1.04 | 30 | 80 | H | >25' |
| 48A | 1.05 | 45 | 40 | H | >25' |
| 48B | 1.17 | 30 | 80 | H | >25' |
| 49 | 0.83 | 30 | 80 | H | >60' |
| 50A | 0.94 | 45 | 40 | L | 5" |
| 50B | 0.71 | 30 | 80 | L | 45" |

Example 49 was not tested by drying for 45' at the lower temperature of 40° C. During repulping, very little foaming was noted and no sticky residue was noted on the equipment such as mixers and containers. The aqueous repulping solution obtained after repulping the coated PAPER BOARD rinsed cleanly away from the equipment indicating that the coating composition was being released into the aqueous alkaline medium.

REPULPABILITY EFFICIENCY: Examples 46-47 showed a slight amount of flakes of unrepulped paper while Example 48 showed a moderate amount of flakes.

The water resistance of coated samples of PAPER BOARD was tested for Examples 46-48 and 50 by soaking the coated samples in aqueous ice slush for one hour and determining the water pickup of the sample. The coated samples for Examples 46-48 were found to be water-resistant in that in many cases very little water was absorbed by the samples tested as reported in Table XIV. Examples 46 and 48 gave uniform, transparent coatings that remained as such after water soaking although Example 48 showed a few slightly white areas after water soaking. Example 47 was difficult to repulp and, after water soaking, the coating cracked and flaked away under stress.

The coating from Example 50 was initially very crystalline and not very white in appearance. After the water soaking, the coating remained very crystalline and undesirably became very white in appearance. The water pickup for Example 50 was unacceptable making a coating of stearic acid unacceptable for use as a paper article coating where the paper is to come in contact with water.

TABLE XIV

| Ex. | Coating Pickup (%) | WATER IMMERSION TEST (%) |
|---|---|---|
| 46 | 72.5 | 1.52 |
| 47 | 230 | 2.96 |
| 48 | 77.5 | 0.55 |
| 50 | 65 | 33.3 |

EXAMPLE 51-52

In these comparative Examples, a hot melt wax coating was prepared along the lines of the article from the April 1992, Tappi Journal, Vol. 75, No. 4, pages 37 and 39 noted above which taught adding unspecified amounts of aluminum stearate soaps to paraffin wax to make repulpable hot melt wax coatings.

In Example 51, 5% aluminum stearate (Aluminum Stearate #132 from Witco) was hot blended with 95% PARAFFIN B. High temperatures in the range of 100° C.-140° C. were needed to blend the ingredients together. The melt viscosity of the blend was such that the coating was a viscous, pituitous, semi-gel even at 130° C. where the wax pickup on the PAPER BOARD was an unacceptable average of 250%. The resulting coating was opaque due to its thickness and contained bubbles from the coating process.

By reducing the amount of aluminum stearate to 2% of the total aluminum stearate and paraffin wax composition, the coating pickup was in the commercially desirable range of about 30-80%.

In Example 52, PAPER BOARD was coated with a hot melt wax coating containing 2% aluminum stearate and 98% of the above paraffin wax for an average coating pickup of 69%. The coated PAPER BOARD was subjected to the modified REPULPING METHOD used in Examples 46-50. The resulting repulped paper sheet weighed 0.84 g and showed some traces of grease (wax) spots after being dried in an oven for 30' at 80° C. The WATER CONTACT ANGLE was rated as being High and the WATER SOAK-IN TIME was >25'. The important aspect of the repulping of this sample was that waxy residues were found to adhere on all equipment used in the repulping process such as the beakers, screens, spatulas, mixers, thermometer and the like. Flakes of waxy residues were also noted in the aqueous repulping medium. Most of the flakes observed were removed from the surface of the repulped paper during the roller step used to squeeze the aqueous repulping medium from the paper and were found to adhere to the top screen used to make the paper sheet.

The coated PAPER BOARD was found to repulp very slowly compared with PAPER BOARD coated with hot melt wax compositions of the present invention. The paraffin wax from the paper was not deemed to be releasing effectively in view of the small amount of aluminum stearate that could be added without undesirably increasing the viscosity level of the molten coating composition.

EXAMPLES 53–54

In these comparative Examples, a monocarboxylic acid acrylic addition polymer and a maleic anhydride/styrene/1-alkene addition polymer were substituted for the dicarboxylic acid/1-alkene polymers used in the present invention. The polymers tested contained significant aromatic content and were found to be incompatible with the paraffin wax. Thus, they were not deemed to be useful as ingredients for hot melt wax compositions useful in the present invention.

In Example 53, POLYMER O was heated in an aluminum weighing dish to melting on a hot plate and an attempt was made to blend 1 part of the molten POLYMER O with 3 parts of paraffin wax. This attempt failed because the molten POLYMER O was not miscible with the molten paraffin wax. Then 0.5 parts of molten POLYMER O was mixed with 0.5 parts of molten stearic acid to produce a homogeneous blend. However, one part of that blend was found to be immiscible with three parts of paraffin wax because it turned cloudy and a precipitate formed. Thus, POLYMER O was not suitable for use in hot melt wax compositions of the present invention.

In Example 54, POLYMER P was heated in an aluminum weighing dish to melting on a hot plate and an attempt was made to blend 1 part of the molten POLYMER P with 3 parts of paraffin wax. This attempt failed because the molten POLYMER P was not miscible with the molten paraffin wax. Then 0.5 parts of molten POLYMER P was mixed with 0.5 parts of molten stearic acid to attempt to produce a homogeneous blend. This attempt also failed because the molten POLYMER P was not miscible with the stearic acid. Thus, POLYMER P was not suitable for use in hot melt wax coating compositions of the present invention.

EXAMPLES 55–56

These Examples demonstrate the use of oxidized microcrystalline waxes in addition to paraffin wax in the hot melt wax coating compositions of the present invention.

Example 55 contained 60% PARAFFIN B; 15% oxidized microcrystalline wax sold as CARDIS® Wax 314 by Petrolite Specialty Polymers Group; 12.5% POLYMER B; and 12.5% stearic acid. Example 56 had the same formula as Example 55, but contained 15% oxidized microcrystalline wax sold as CARDIS® Wax 370 by Petrolite Specialty Polymers Group in place of the CARDIS® Wax 314.

Example 55 had a coating pickup of 53.8% and Example 56 had a coating pickup of 54.7% for one sample of PAPER BOARD each. Each coated PAPER BOARD was subjected to the REPULPING METHOD. The pH values of the washes during repulping for each sample averaged 9.8 for the first wash, 10.25 for the second wash and 8.84 for the third wash. The resulting repulped paper sheet from Example 55 weighed 0.93 g after being dried in an oven for 30' at 80° C. The resulting repulped paper sheet from Example 56 weighed 0.92 g after being dried in an oven for 30' at 80° C. The WATER CONTACT ANGLE for each coated PAPER BOARD was rated as being High and the WATER SOAK-IN TIME was >25'. No waxy residues were found to adhere on the equipment used in the repulping process.

EXAMPLE 57

These Examples demonstrate the incorporation of an amine-functional surfactant into the polymers used in the present invention to form imide groups from some of the anhydride groups in the polymer and improve dispersibility of the wax away from the paper fibers during repulping.

The coating composition of Example 57 was 75% paraffin wax (55.6° C.–56.7° C. melting point); 12.5% POLYMER A; 3.65% JEFFAMINE® M-1000; 2.15% of 2-(2-aminoethoxy)ethanol sold as Diglycolamine by Texaco; and 6.7% stearic acid sold as EMERSOL® 132 by Henkel Corp./Emery Group. The coating composition was made by blending the paraffin and POLYMER A together at 120° C. with stirring. The JEFFAMINE® M-1000 was added to the stirring mixture followed by the Diglycolamine, dropwise, at 120° C. With continued stirring, the mixture was heated to 135° C. and that temperature was maintained for 22'. The product was initially opaque, but later became turbid, translucent and light orange in color. The heating was stopped and the mixture was allowed to solidify over a one hour period. It was then reheated to 135° C. with stirring and kept at that temperature for another 23'. The product turned a darker orange color and remained turbid. It Was heated to 150° C. with stirring and held for 5' to try to eliminate the turbidity and then heated to 160° C. and held there for 10'. The product had become even darker orange and remained turbid. The product was then cooled to 110° C., the stearic acid was added and stirring was continued for an additional 15' at 100° C. The resulting hot wax coating composition was with cold or hot water and sent to the paper making machine to be made into paper that was then tested for water sensitivity and paraffin wax content. Optionally, an extra dewatering and dilution step was tried prior to sending the pulp to the paper making machine. A screen on the equipment used in some runs had a 0.25 in (0.64 cm) mesh and thus only permitted a coarse screening of the pulp which only removed the larger flakes of unpulped or unpulpable material. This was a much coarser screen than is normally used commercially (i.e., about 0.010 in (0.025 cm) mesh) and may have allowed some unrepulped flakes of wax-containing fibers to get through the repulping process and remain associated with the repulped fibers made into paper.

Repulping in the HYDRAPULPEd™ machine was monitored by periodic sampling of the pulp every 10'–15'. The pH was measured on water squeezed from the pulp which seemed to give a pH reading about 0.2–0.4 units higher than the pulp itself. Samples of the pulp were also checked with water in a one liter graduate cylinder to check for any remaining flakes of unpulped material (i.e., for REPULPABILITY EFFICIENCY). Finally, "press pads" of paper were handmade from the pulp to check for completeness of repulping and for wax removal. The press pads were made by washing the pulp on an ASTM Tyler 80 mesh screen with 140° F. (60° C.) water followed by squeezing the pulp together between the hands to remove water and to form a "patty." The patty of the washed pulp was placed between two fine mesh screens and pressed out between two pieces of felt in a wringer-like roller device. The roller squeezed out the aqueous media to give a 3–4 in (7.6–10.2 cm) diameter paper pad. That paper pad was then dried on a Noble & Wood Sheet Machine (from Noble & Wood Machine Company of Hoosick Falls, N.Y.). The dryer was steam-heated to about 200° F. (92° C.). The repulped paper was checked for evidence of greasy or oily spots. Repulping was considered to be complete when the amount of unpulped flakes seen in the graduate cylinder was reduced to a minimum. It was also found that the temperature of the wash water should be kept above the melting point of the paraffin wax to obtain best removal of the wax coating from the fibers, transferred to an aluminum foil-lined pan at 100° C. and allowed to solidify by cooling to room temperature.

Samples of PAPER BOARD were coated by DIP COATING with the coating composition of Example 57 and an average coating pickup of 63.8% was obtained by DIP COATING, but at 100° C. A water drop placed on the surface of the coated PAPER BOARD beaded and did not soak into the coated PAPER BOARD after 65' contact at room temperature.

A coated PAPER BOARD sample was subjected to the REPULPING METHOD. The pH values of the washes during repulping were 10.1 for the first wash, 10.4 for the second wash and 9.8 for the third wash. The resulting repulped paper sheet from Example 57 weighed 0.88 g after being dried in an oven for 30' at 80° C. The WATER CONTACT ANGLE for the coated PAPER BOARD was rated as being High and the WATER SOAK-IN TIME was greater than one hour.

EXAMPLE 58–59

These Examples describe the results of testing hot melt wax coatings of the present invention in both pilot plant scale and large scale, laboratory size equipment.

The coating compositions tested were 75% PARAFFIN B; 12.5% POLYMER A (Example 58) or POLYMER B (Example 59); and 12.5% stearic acid. Example 59 containing POLYMER B was thought to be more readily dispersible at lower pH values than Example 58 due to the presence of 1-decene units instead of the more hydrophobic 1-octadecene units found in POLYMER A. This was found to be true.

Corrugated paper cartons were coated with each coating composition at 80 lb. (36.3 kg) of coating per 100 lb. (45.4 kg) of corrugated paper (80% coating pickup).

Repulping was conducted in a 1,000 gal (3785 l) capacity HYDRAPULPER™ repulping machine from Black Clawson of New York, N.Y. at 140° F. (60° C.) at a consistency of 8% paper fiber content using tap water having a pH value of 8. The pulp was then diluted in a tile storage chest with hot or cold water to a 0.7%–1.0% pulp content and then optionally screened and dewatered in a screw press to 10%–12% pulp content. The dewatered pulp was again diluted in a tile storage chest A variety of processes were tried to obtain repulped paper since hot melt wax coatings are not commercially repulped and no established methods for doing so existed. One difference from the foregoing Examples was that, in most runs, only two rinses were used during repulping instead of the three rinses used in the REPULPING METHOD. This, the larger mesh screen, and, possibly, the use of water instead of an alkaline solution as a rinse apparently contributed to higher residual levels of wax in the repulped paper. Other factors believed to be contributing to the higher residual wax content were use of insufficient base in the early stages of repulping or use of insufficient polymer and fatty acid in the hot melt compositions used for coating.

Runs 1 and 6 used uncoated corrugated paper stock as comparative example runs. Run 1 involved placing 270 lb. (122.5 kg) of blank kraft process corrugated paper stock (no hot melt wax coating) in the HYDRAPULPER™ machine and repulping in 400 gal (1514 l) of 140° F. (60° C.) tap water (8% paper fiber content) followed by transfer to a storage chest where the pulp was diluted to 0.7–1% fiber content with unheated (cold) tap water. This diluted product was then passed through a screw press to dewater the pulp to 10–12% fiber content. The pulp was then passed into another storage chest and diluted to 0.3% paper fiber content with unheated tap water. That diluted pulp was then passed into a pilot plant scale Fourdrinier paper making machine and made into a roll of paper.

Run 6 involved placing 270 lb. (122.5 kg) of blank white-printed corrugated paper stock (no hot melt coating) in the HYDRAPULPER™ machine and repulping in 400 gal (1514 l) of 140° F. (60° C.) tap water at 8% paper fiber content for 40' followed by transfer to a storage chest where the pulp was diluted to 0.3% fiber content with 140° F. (60° C.) tap water. One half of that diluted pulp was then passed into a paper making machine as described above and made into a roll of paper. The other half of the diluted pulp was used in Run 5C as described below.

Run 2 used 90 lb. (40.8 kg)—20%—of plain corrugated paper stock coated with Example 58 and 200 lb. (90.7 kg)—80%—of uncoated corrugated paper stock ("20:80 Stock Mixture"). The 20:80 Stock Mixture was used in this Run and in Runs 3–5 with coatings as specified to simulate a possible commercial situation in which the paper feedstock is made up of a mixture of both uncoated paper and paper coated with the composition of the present invention. The amount of water in the repulping machine for all runs was 400 gal (1514 l).

After the paper stock was charged to the repulping machine, 900 g of sodium hydroxide was added to the agitating mixture. The time allowed for repulping was 120'. The initial pH after addition of the sodium hydroxide was 11 which reduced to 9.3 after completing the repulping step. The contents of the repulping machine was then transferred to a storage chest where the pulp was diluted to 0.7%–1% fiber content with 150° F. (65.6° C.) tap water. This diluted product was then passed through a screw press to dewater the pulp to about 12% fiber content. The dewatered pulp was passed into another storage chest and diluted to 0.3% paper fiber content with unheated tap water. That diluted pulp was then passed into the paper making machine described above and made into a roll of paper.

Two different procedures were used for Run 3 after the repulping step that was common to both. The 20:80 Stock Mixture (Example 58 was the coating used on the coated paper stock) was added and pulped as in Run 2, but the addition of the sodium hydroxide was different. In this Run, 277 g of sodium hydroxide was initially added before the 20:80 Stock Mixture and six increments of 100 g each of sodium hydroxide were added over the total three hour period during which the 20:80 Stock Mixture was pulped. The initial pH was 10.7 which fell to 9.8 at the end of the three hour pulping process. The contents of the repulping machine was then transferred to a storage chest where the pulp was diluted to 0.7%–1% fiber content with 140° F. (60° C.) tap water. At this point the pulp was divided into two equal portions.

In Run 3A, the pulp from the pulping machine was not screened and was simply passed through a screw press and dewatered to a fiber content of about 10%–12% fiber content. The dewatered pulp was passed into another storage chest and diluted to 0.3% paper fiber content with unheated tap water. That diluted pulp was then passed into the paper making machine described above and made into a roll of paper.

In Run 3B, the pulp from the pulping machine was screened through the 0.25 in (0.64 cm) mesh screen and then passed through a screw press and dewatered to about 10%–12% fiber content. The dewatered pulp was passed into another storage chest and diluted to 0.3% paper fiber content with unheated tap water. That diluted pulp was then passed into a paper making machine and made into a roll of paper.

Two different procedures were used for Run 4 after the repulping, dilution, screening, dewatering and dilution steps that were common to both. The 20:80 Stock Mixture (Example 59 was the coating used on the coated paper stock) was added and pulped as in Run 2, but the addition of the sodium hydroxide was different and lower. In this Run, 125 g of sodium hydroxide was initially added before the 20:80 Stock Mixture and 75 g followed by three increments of 50 g each of sodium hydroxide was added over the total 1.5 hour period during which the 20:80 Stock Mixture was pulped. The pH of the mixture in the pulping machine was kept at about 7.8 throughout the pulping process. The contents of the repulping machine was then transferred to a storage chest where the pulp was diluted to 0.7%–1% fiber content with 140° F. (60° C.) tap water. The pulp from the pulping machine was screened through a 0.25 in (0.64 cm) mesh screen and passed through a screw press and dewatered to about 10%–12% fiber content. The dewatered pulp was passed into another storage chest and diluted to 0.3% paper fiber content with unheated tap water. At this point the pulp was divided into two equal portions.

In Run 4A, a one-half portion was passed into the paper making machine the next day and made into a roll of paper.

In Run 4B, the other half of the pulp was again passed through a screw press and dewatered to about 10%–12% fiber content. The dewatered pulp was passed into another storage chest and diluted to 0.3% paper fiber content with 140° F. (60° C.) tap water. That diluted pulp was then passed into the paper making machine and made into a roll of paper.

Three different procedures were used for Run 5 after the repulping, dilution, dewatering, screening, and dilution steps that were common to all three. The 20:80 Stock Mixture (Example 59 was the coating used on the coated paper stock) was added and pulped as in Run 2, but the addition of the sodium hydroxide was different and lower. In this Run, 450 g of sodium hydroxide was initially added before the 20:80 Stock Mixture and 50 g followed by three increments of 100 g each of sodium hydroxide was added over the total 1.5 hour period during which the 20:80 Stock Mixture was pulped. The pH of the mixture in the pulping machine was kept at about 8.8–9.1 throughout the pulping process. The first wash, screening of pulp, and screw pressing were all the same as those used in Run 4. The dewatered pulp from the screw pressing was passed into a storage chest and diluted with 140° F. (60° C.) tap water to 0.3% paper fiber content. At this point the pulp was divided into three equal portions.

In Run 5A, a one-third portion was passed into the paper making machine and made into a roll of paper.

In Run 5B, a one-third portion of the pulp was again passed through a screw press and dewatered to about 10%–12% fiber content. The dewatered pulp was passed into another storage chest and diluted to 0.3% paper fiber content with 155° F. (68.3° C.) tap water. That diluted pulp was then passed the next day into the paper making machine at 140° F. (60° C.) and made into a roll of paper.

In Run 5C, one part of the pulp from Run 5B was transferred to a storage chest at 140° F. (60° C.) and mixed with four parts of the diluted pulp from Run 6 noted above. The resulting mixture of pulp thus contained about 0.3% of fibers, one-fifth of which was from the corrugated paper coated with Example 59. This pulp mixture was then passed into the paper making machine and made into a roll of paper. Run 5C gave some problems on the paper making machine with the buildup of a gray, putty-like material on the dandy roll which caused breaks in the paper. This was found to be a mixture of organic and inorganic material as determined by burning a sample over a Bunsen Burner. It may have been due, at least in part, to the wax-free pulp from Run 6 which had not been cleaned up with a washing/dewatering step. Unlike the other Runs, Run 6 was noted as being uncharacteristically foamy in the headbox of the paper making machine.

The paper made from Runs 1 and 6 were rapidly wetted by water followed by near instantaneous absorption of the water. For Runs 2 through 5B, water droplets on the paper exhibited High contact angles and resisted water penetration for more than 25' of contact at room temperature. Water droplets on paper from Run 5C displayed a fairly low water contact angle and showed signs of wetting the paper within about 10"–15". However, water penetration into the paper from Run 5C was very slow and the droplets had still not completely penetrated the paper after 20' of contact time.

The residual wax contents (average of four samples) of the sheets of paper from each of the above runs were determined by extraction with 1,1,1-trichlorethane for a two hour period in Soxhlet refluxing apparatus and are reported in Table XV:

TABLE XV

| Run No. | Residual Wax (%) |
| --- | --- |
| 1 | 0.0 |
| 2 | 3.4 |
| 3A | 2.4 |
| 3B | 2.3 |
| 4A | 4.5 |
| 4B | 3.5 |
| 5A | 2.8 |
| 5B | 1.8 |
| 5C | 0.0 |
| 6 | 0.0 |

The pulp was dried by passing it over a series of steam-heated rotating cylindrical drums in the paper making machine. This was believed to be hot enough to melt any residual wax left in the pulp being made into paper. Most of the paper from the Runs using coated corrugated paper contained significant amounts of residual wax content. Variations in procedure affected the residual wax content as can be seen from Runs 3A, 3B, 5A and 5B. In Run 5C, the residual wax content was nil when most of the corrugated paper stock being repulped was uncoated. Adding the sodium hydroxide to the repulping machine before addition of the coated paper articles tended to reduce residual wax content as can be seen in Runs 3A and 3B. The use of heated water to dilute the pulp also appeared to reduce the residual wax content of the repulped paper as can be seen by comparing Run 4A with Run 4B. The additional heated water dilution step used in Run 5B resulted in a reduced residual wax content as compared with Run 5A which only used two dilution steps.

The repulped paper from Runs 2 through 5B displayed High WATER CONTACT ANGLES and the WATER SOAK-IN TIME exceeded 25 minutes.

Another series of four runs was made using large scale laboratory repulping equipment. The repulping machine was a four gallon Laboratory Model 4.25 SLUSHMAKER repulping machine from Morden Machines Company of Portland, Oreg. This machine was used to repulp a combination of corrugated paper coated with the composition of Example 59 and uncoated corrugated paper such that the pulp obtained came from a total of (a) 1% coated corrugated paper (1798 g uncoated paper and 32.7 g coated paper—Run 7), (b) 2.5% coated corrugated paper (1771 g uncoated paper and 81.9 g coated paper—Run 8), (c) 5% coated corrugated paper (1725 g uncoated paper and 163.8 g coated paper—Run 9) and (d) 10% coated corrugated paper (1634 g uncoated paper and 327.6 g coated paper—Run 10). The coated corrugated paper had a coating pickup of 51.7%. The repulping was conducted in alkaline (sodium hydroxide) aqueous medium at pH 9 at 140° F. (60° C.) for 40 minutes.

The pulp was made into paper hand sheets using a Noble & Wood Sheet Machine made by Noble & Wood of Hoosick Falls, N.Y. which dried the paper hand sheet at 93° C. (200° F.) for about one to two minutes.

The residual wax content for the repulped paper hand sheets was determined as above and the WATER SOAK-IN TIME was also determined. The results are reported in Table XVI.

TABLE XVI

| Run No. | Calculated Coating Content in Blend (%)[1] | Residual Wax (%) | WATER SOAK-IN TIME |
|---|---|---|---|
| 7 | 0.6 | 0.0 | 16" |
| 8 | 1.5 | 0.0 | >25' |
| 9 | 2.9 | 0.0 | >25' |
| 10 | 5.7 | 0.9 | >25' |

[1]Assumes that the 51.7% coating pickup equaled 34% coating content on coated corrugated paper and the remainder was uncoated paper fibers.

In Runs 7–10, the reduction in original content of coated corrugated paper resulted in much lower residual wax contents in the repulped paper samples. At the lowest level of coated corrugated paper, the repulped paper was essentially free of residual wax and was quite hydrophilic as measured by the WATER SOAK-IN TIME.

EXAMPLES 60–65

These Examples illustrate the use of other types of polymers in the hot melt polymer-wax compositions of the present invention. The compositions prepared are described in Table XVII where the polymers used are designated parenthetically by letter. Two PAPER BOARDS were coated with each composition using DIP COATING, with the exception that Example 62 was applied at 80°–85° C. due to its higher viscosity than the other compositions at 70°–75° C. The average value of Coating Pickup for both coated PAPER BOARD samples is reported in Table XVII.

The results obtained from running the WATER IMMERSION TEST on one of the two coated PAPER BOARD samples is also reported in Table XVII. Only Example 61 showed poor results in this test. It was noted that the coated PAPER BOARD sample tested was not evenly coated because some of the areas of the sample appeared water repellent while others were not after immersion in water. In general, the composition of Example 61 gave a coating that was somewhat soft and sticky suggesting that more wax and less polymer may be necessary to obtain a better, more water-resistant coating composition. Examples 63 and 64 were reformulations of Examples 60 and 62 using lower levels of polymers which resulted in coatings that were easier to apply at 70°–75° C.

TABLE XVII

| Ex. | PARAFFIN A (%) | Stearic Acid (%) | POLYMER (%) | Coating Pickup (%) | WATER IMMERSION TEST (%) |
|---|---|---|---|---|---|
| 60 | 60 | 10 | 30 (Q) | 103 | 0 |
| 61 | 70 | 10 | 20 (R) | 63 | 11.7 |
| 62 | 70 | 0 | 30 (S) | 208 | 0.25 |
| 63 | 60 | 30 | 10 (Q) | 65 | 0 |
| 64 | 70 | 20 | 10 (S) | 57 | 0.49 |

The Examples followed by an "A" or "B" designation in Table XVIII reports the results of subjecting the coated PAPER BOARDS described in Table XVII to the REPULPING METHOD, but using 4.2 g/l aqueous sodium bicarbonate solution as the repulping media. The pH values for the first wash (repulping) solutions used in the REPULPING METHOD for these Examples were between 8.2 and 8.6.

TABLE XVIII

| Ex. | Weight of Paper (g) | Dry Time (min) | Drying Temp. (°C.)[1] | Spots on Repulped Paper? | WATER CONTACT ANGLE | WATER SOAK-IN TIME |
|---|---|---|---|---|---|---|
| 60A | NR | 30 | 80 | YES | M | >25' |
| 60B | NR | 30 | 80 | YES | M | >25' |
| 61A | NR | 30 | 80 | YES[2] | M | >25' |
| 61B | NR | 30 | 80 | YES[2] | M | >25' |
| 62A | NR | 30 | 80 | YES[3] | H | >25' |
| 62B | NR | 30 | 80 | YES[3] | H | >25' |
| 63A | NR | 30 | 80 | YES | M to H | >25' |
| 63B | NR | 30 | 80 | YES | M to H | >25' |
| 64A | NR | 30 | 80 | YES | M to H | >25' |
| 64B | NR | 30 | 80 | YES | M to H | >25' |

NR = Not Recorded

[1]The oven used was different from the oven used in the previous Examples in that it was not an air circulating oven and thus the drying temperature may have ranged from 75° C. to 90° C.
[2]The greasy or oily spots noted were rather pale and few in number.
[3]The greasy or oily spots noted were very brown in color and had a spotted pattern, similar to cork.

The following was noted about the repulping of the PAPER BOARDS coated with each of the above compositions:

The coated PAPER BOARDS from Example 60 were difficult to repulp. The pulp showed a tendency to separate from the water. No scum or deposits were observed on the equipment used to repulp the samples. The pulp and wet handsheets were whiter in appearance than observed for other PAPER BOARDS coated with compositions of the present invention. The paper handsheet from one of the samples stuck to the screen while the handsheet from the other did not. Very little foaming was observed during repulping. REPULPABILITY EFFICIENCY: a moderate amount of unpulped flakes of all sizes was observed, some of which were quite large. The pulp almost completely separated from water.

The coated PAPER BOARDS from Example 61 were found to be fairly easy to repulp. Some foam was noted during repulping, but not a large amount. No residue was noted on the repulping equipment. REPULPABILITY EFFICIENCY: not many flakes were noted, they were of varying sizes.

The coated PAPER BOARDS from Example 62 were found to be very difficult to repulp. The small pieces into which the coated PAPER BOARD had been cut prior to repulping tended to stick together beneath the blender head used for repulping. Additional heated sodium bicarbonate solution had to be used to complete the repulping process. A scum of small particles of hydrophobic material was found to coat the repulping equipment. The filter cakes tended to stick to the filter. REPULPABILITY EFFICIENCY: numerous small flakes were observed. The pulp tended to separate from water. No foaming was observed. It was also noted that during the preparation of the coating composition and during the coating process, the composition appeared to be somewhat inhomogeneous. Translucent lumps of composition were noted at its melting point that may possibly have been the polymer crystallizing independent of the wax. A waxy material was noted at the base of the repulping equipment and that coating could not be easily wiped away.

The coated PAPER BOARDS from Example 63 were found to be moderately easy to repulp. A moderate amount of foam was observed during repulping, but was not considered especially troublesome. No scum was left on the repulping equipment. REPULPABILITY EFFICIENCY: the presence of flakes was judged slight to moderate with no really large flakes noted.

The coated PAPER BOARDS from Example 64 were found to be the same or a little more difficult to repulp than for Example 62. Less foaming was observed for these coated samples than for Example 62. However, no scum was observed on the repulping equipment. REPULPABILITY EFFICIENCY: moderate to heavy amounts of flakes were observed, some were very large.

In Examples 60 and 61, stearic acid was used to render the polymer more compatible with the wax so a homogeneous composition was obtained.

Example 61 resulted in a coating that was somewhat soft and sticky and did not give very good water resistance. However, the composition did repulp cleanly and without difficulty to give repulped paper that was relatively clean in appearance (only a few pale blemishes).

Relatively high coating pickup was observed for Examples 60 and 62 and these compositions repulped poorly, particularly Example 62. By reformulating these Examples by reducing the level of polymer to produce Examples 63 and 64, coated PAPER BOARDS of lower coating pickup values were obtained which repulped without leaving significant undesirable deposits on the repulping equipment. Repulped paper from Examples 63 and 64 did contain some signs of dark spots although in neither case was this deemed to be a severe problem. The repulped paper from Example 63 was somewhat cleaner than that obtained from Example 64.

All repulped paper samples had WATER CONTACT ANGLE values of from Medium to High although the WATER SOAK-IN TIME values were all in excess of 25'.

EXAMPLES 65–71

These Examples involve the repulping of corrugated paperboard stock coated with the compositions of the present invention. The coated stock was repulped in large scale pilot plant size repulping and papermaking equipment.

The coating compositions tested were 60% PARAFFIN-A, 20% of POLYMER T, and 20% stearic acid. This composition was dip-coated onto old corrugated (paper) cartons ("OCC"). The coating pickup averaged about 70%.

To evaluate possible commercial recycling operations, the objective was to simulate repulping of an 80/20 blend of uncoated OCC/coated OCC, the latter of which would typically have a commercially typical coating pickup of 50%. Thus, the overall average coating pickup for the entire blend would be about 10%. To achieve this objective, it was necessary to correct for the actual coating pickup average of 70% and to also correct for moisture uptake by the uncoated OCC because of the high ambient humidity in the pilot plant. The humidity correction was estimated at 10% of the weight of the OCC. Minor corrections were also made for differences in coating pickup from one bundle of coated OCC to the next. Thus, typically, the composition of the paper blend repulped was 477 lb (216.4 kg) of uncoated OCC and 128 lb (58.1 kg) of coated OCC where the coated OCC contained about 55 lb (24.9 kg) of coating composition and 73 lb (33.1 kg) of paper fiber. A comparative run (Example 70) employed as a control used 550 lb (294.5 kg) of uncoated OCC. Half that amount of uncoated OCC was used in comparative Example 69.

The repulping runs were conducted in a 2000 gal (7571 l) tile-lined repulper (Black Clawson 8' HCVT HYDRAPULPER®) equipped with side baffles, a 24 in (61 cm) rotor blade on the bottom for agitation which was driven through a drive assembly by a 100 horsepower, 600 rpm motor, a heat exchanger and steam line for heating the water, and transfer lines to various storage tanks.

Two storage tanks and two machine chests were available for use. Each was tile lined for insulation and equipped with low-shear propellers for agitation. They were of 3500 gal (13,249 l) capacity and none possessed heating capabilities.

A Rice-Barton Model 9 Extractor (screw press) having a 7.5 horsepower variable speed drive equipped with 0.0625 in (0.1588 cm) perforations was used for dewatering the pulp from the pulper (only used in Examples 70–71). This increases the consistency (fiber concentration) of pulp from about 3.5% to 5% initially up to about 12% to 15% after dewatering. Screw press dewatering was found to be extremely slow and time consuming. As described below, it was found that the use of screw press dewatering could be eliminated and that the repulped paper was of better quality than when it was used.

The machine chests were used to dilute the pulp from other processes prior to running on the Fourdrinier paper machine. They were of 3500 gal (13,249 l) capacity.

A 36 in (91.4 cm) Fourdrinier type paper machine having a 38 in (96.5 cm) wire width which was capable of operating and producing paper at the rate of 75 feet/minute (22.9 meters/minute) was used to convert the diluted pulp into paper.

The wet end of the Fourdrinier paper machine was also used as a substitute for the screw press to obtain a second dewatering of the pulp in Examples 70–71. The dewatered pulp from the paper machine was in the form of wet lap (pulp of about 20% solids consistency). It was sent back to the machine chest for final dilution prior to making into paper. This substitute procedure was instituted to circumvent the slow operating speed of the screw press.

Repulping was carried out by adding 1,200 gal (4542 l) tap water (total level of hardness was 31 ppm) and heating it to the desired temperature (70° C. for Examples 65–69 and 68° C. for Examples 70–71) under agitation. The agitation was continued throughout subsequent steps. However, temperatures in the pulper were raised about 3° C. above the target temperature to offset any cooling in subsequent stages of the pulping/paper making process since there were no heating means available once the product left the pulper.

Upon reaching the desired temperature, 62.5 lb (28.3 kg) of sodium carbonate (soda ash, 99%) was added to the heated water. The pH of the solution was about 10.7.

The coated OCC was added to the aqueous sodium carbonate solution in the pulper followed by the uncoated OCC. Some minor foaming was noted when the coated OCC was added, but it decreased to almost nil by the time all of the uncoated OCC was added. Thereafter, no significant foaming was observed. Repulping was judged to be substantially complete within a few minutes of the time all of the coated and uncoated OCC was added.

Additional hot tap water was added to the pulper to reach a total of 1,700 gal (6435 l). Repulping was continued for an additional 25–30 minutes. In all runs, repulping appeared to be complete after 25 minutes as measured by the REPULPABILITY EFFICIENCY test. However, since Examples 65–66 and 67–68 were each split batches, the second half of the batch was retained in the pulper about one hour more until the processing of the first half of the batch was completed.

The pulp was then sent directly to the machine chest for dilution and paper making for Examples 65–69, but to the screw press for dewatering for Examples 70–71.

In Examples 65–66, the pulp from the repulper was split into two separate batches by sending the first 850 gal (3218 l) of pulp from repulper into a machine chest containing 1,000 gal (3785 l) of cold (about 16°–20° C.) tap water taken directly from the water main and then sending that diluted pulp to the Fourdrinier paper machine for paper making (Example 65).

The remaining 850 gal (3218 l) of pulp from the repulper was then passed into a machine chest containing hot (68° C.) aqueous 0.03M sodium carbonate—30 lb (13.6 kg) soda ash, 99%, in 1000 gal (3785 l) of tap water. This diluted pulp was then sent to the Fourdrinier paper machine for paper making (Example 66).

Thus, the dewatering step using a screw press was eliminated. In other runs, it was found that the use of the screw press in these repulping operations was not only slow and time consuming, but resulted in repulped paper having greasy or oily spots in runs made using coated OCC and uncoated OCC as described above. Example 70 used the screw press dewatering step, but no coated OCC was used in that Example.

Example 67 was a confirmation run of Example 65 using the same split batch procedure where Example 67 used one half of the pulp from the 80/20 blend of uncoated and coated OCC charged to the repulper.

Example 68 was a repeat of Example 67 using the other half of the pulp from Example 67. However, in Example 68, the tap water in the machine chest was heated to 50° C. instead of using cold tap water directly from the water main to more closely approximate conditions expected in a commercial repulping mill operation.

Example 69 was a comparative Example used as a control wherein the same procedure used in Example 68 was used, but using 100% uncoated OCC.

Examples 70 and 71 were conducted before Examples 65–69 were run.

Example 70 was a comparative Example used as a control where 100% uncoated OCC was repulped and made into paper using additional pulp dewatering and washing steps. After the pulp was dewatered in the screw press, it was then sent to the machine chest for dilution with 1,000 gal (3785 l) of tap water at 74° C. as a washing step. The pulp was dewatered again, but this time it was dewatered on the wet end of the paper machine. The dewatered pulp, a wet lap of about 20% solids consistency, was then sent back to the machine chest to be diluted again with 1000 gal (3785 l) of tap water as another washing step before it was made into paper.

Example 71 was done in essentially the same manner as Example 70, but used the above-described 80/20 combination of uncoated/coated OCC.

In Example 71, white particles (approximately 0.0625 in to 0.25 in (0.16 cm to 0.64 cm) in diameter) were observed at the pulp surface in the machine chest and on the wire at the wet end of the Fourdrinier paper machine. Ultimately, the white spots appeared as greasy or oily spots in the repulped paper at the dry end of the paper machine. White particles were also noted on the paper machine at the beginning of the runs for Examples 65, 67 and 69, but tended to diminish and disappear as the run progressed. It was thought that these particles were derived from pulp remaining in the Fourdrinier headbox from the previous run.

During the run for Example 69, the pulp on the wire of the Fourdrinier paper machine took on a foamy appearance. This, upon closer inspection, appeared to be a copious amount of tiny bubbles that were presumed to be carbon dioxide from the soda ash.

The repulped paper from each run was made on the basis of 33 lb per 1,000 square feet (15 kg per 92.9 square meters). The actual basis weights obtained are reported in Table XIX.

Paper from Examples 65–70 appeared clean and free of blemishes. Paper from Example 71 was liberally and uniformly speckled with greasy or oily spots of approximately 0.25 in (0.64 cm) or less. Repulped paper from Examples 65–69 were all observed to be water sensitive when sprinkled with a few drops of water immediately after the paper was made. Paper from Examples 65, 68 and 69 appeared to be more water sensitive than paper from Example 66 which used an additional amount of sodium carbonate in the machine chest. Another unexplained result was that paper from Example 67, a replication of Example 65, was relatively water insensitive.

The results of testing the repulped paper are summarized in Table XIX where "A" and "B" indicate tests were run on different samples of repulped paper. The water sensitivity tests for Example 70 were not run since it was quite water sensitive and was a control.

Table XIX also includes "Cobb Test" values which are measure of the water sensitivity of the repulped paper as measured on the top and on the bottom of the repulped paper sheet. The Cobb Test is run according to the procedure given in TAPPI Test Methods, 1992–1993, method T-441. Water is poured on a defined area of paper for a specified period of time and then blotted off in a controlled way. The amount of weight gain for absorbed water is determined in grams per square meter. Generally, lower values indicate lower water sensitivity. For example, a Cobb Test value of between about 30 to 60 g/m$^2$ is observed for paperboards used in liners for corrugated paperboard which are sized to render them fairly water resistant. Paper having a Cobb Test value on the order of greater than about 200 g/m$^2$ is considered to be quite water sensitive.

TABLE XIX

| Ex. | Number of Drops | WATER SOAK-IN TIME | WATER CONTACT ANGLE | Basis Weight of Paper[1] | Cobb Test Value (g/m² after 2 min) Top | Cobb Test Value (g/m² after 2 min) Bottom |
|---|---|---|---|---|---|---|
| 65A | 3 | 0.2' | L | 34.1 (15.5) | 269.7 | 347.5 |
| 65B | 11 | 1.1' | L | NE | NE | NE |
| 66A | 9 | 7.1' | L TO M | 32.1 (14.6) | 374.3 | 397.5 |
| 67A | 13 | 18.4' | M to H | 31.6 (14.3) | 179.1 | 75.0 |
| 67B | 8 | 19.7' | M to H | NE | NE | NE |
| 68 | 6 | 0.3' | L | 34.2 (15.5) | 486.0 | 475.2 |
| 69 | 7 | 0.05' | L | 34.0 (15.4) | NE | NE |
| 70 | NE | NE | Instantly absorbed | 34.8 (15.8) | NE | NE |
| 71 | 8 | >25' | H | 31.3 (14.2) | 155.4 | 170.7 |

NE = Not Evaluated
[1]First entry is in pounds per 1,000 square feet and parenthetical entry is in kilograms per square meter.
[2]Values corrected to reflect those expected from paper having a basis weight of 33 lb per 1,000 square feet (15 kg per 92.9 square meters)

Based on Table XIX, Examples 65, 66, and 68 were quite water sensitive and thus repulped completely to paper that is essentially free of the water-resistant coating composition and that could be used in almost any paper-related application.

That which is claimed is:

1. A method of rendering fibrous articles water-resistant that comprises the steps of
    heating a hot melt polymer/wax composition that is dispersible in a heated nearly neutral to alkaline aqueous pH medium comprising
    A. from about 20% to 97.5% by weight based upon the total weight of the composition of a water-repellent wax that is a solid at 20° C.;
    B. from about 2.5% to 50% by weight based upon the total weight of the composition of at least one addition polymer selected from the group consisting of
        (i) a polymer of from about 5 to 95 mole percent of at least one ethylenically unsaturated monocarboxylic acid monomer containing a free carboxyl group and from about 5 to 95 mole percent of at least one additional ethylenically unsaturated monomer,
        (ii) a polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group, and from about 5 to 50 mole percent of at least one additional ethylenically unsaturated monomer, and
        (iii) a polymer of a total of from about 5 to 95 mole percent of (a) at least one of the ethylenically unsaturated monocarboxylic acid monomers and (b) at least one of the ethylenically-unsaturated dicarboxylic monomers and from about 5 to 95 mole percent of at least one additional ethylenically unsaturated monomer, wherein the additional ethylenically unsaturated monomer is selected from the group consisting of 1-alkenes having from about 4 to 60 carbon atoms; alkyl vinyl ethers having an ether alkyl group of from about 8 to 60 carbon atoms, and alkyl acrylates or alkyl methacrylates having an alkyl group of from about 8 to 60 carbon atoms, wherein the polymer is compatible with the water-repellent wax; and
    C. optionally, up to about 77.5% by weight based upon the total weight of the composition of at least one fatty acid selected from the group consisting of natural or synthetic fatty acids containing from about 12 to 48 carbon atoms, wherein the fatty acid is compatible with the polymer and wax, the total amount of wax, polymer and fatty acid comprising 100% of the total composition and the polymer is at least 2.5% by weight of the total composition, wherein the composition is a solid at 20° C., but starts to become fluid between about 50° C. and 95° C., until it becomes fluid,
    applying to a fibrous article an amount of the fluid heated composition that is effective to render it water-resistant, and
    allowing the composition to cool to room temperature to form a coated fibrous article having a solid coating that is removable upon exposure of the coated fibrous article to a heated nearly neutral to alkaline pH medium.

2. The method of claim 1 wherein the fibrous article of paper is a sheet of paper.

3. The method of claim 1 wherein the fibrous article of paper is a paperboard article.

4. The method of claim 1 wherein the fibrous article is a corrugated paper article.

5. A method of rendering fibrous articles water-resistant that comprises the steps of
    heating a hot melt polymer/wax composition that is dispersible in a heated nearly neutral to alkaline aqueous pH medium comprising
    A. from about 20% to 97.5% by weight based upon the total weight of the composition of a water-repellent wax that is a solid at 20° C.;
    B. from about 2.5% to 50% by weight based upon the total weight of the composition of at least one addition polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group, and from about 5 to 50 mole percent of at least one additional ethylenically unsaturated monomer selected from the group consisting of 1-alkenes having from about 4 to 60 carbon atoms, and
    C. optionally, up to about 77.5% by weight based upon the total weight of the composition of at least one fatty acid selected from the group consisting of natural or synthetic fatty acids containing from about 12 to 48 carbon atoms, wherein the fatty acid is compatible with the polymer and wax, the total amount of wax, polymer and fatty acid comprising 100% of the total composition and the polymer is at least 2.5% by weight of the total composition, wherein the composition is a solid at 20° C., but starts to become fluid between about 50° C. and 95° C. until it becomes fluid,
    applying to a fibrous article an amount of the fluid heated composition that is effective to render it water-resistant, and allowing the composition to cool to room temperature to form a coated fibrous article having a solid coating that is removable upon exposure of the coated fibrous article to a heated nearly neutral to alkaline pH medium.

6. The method of claim 5 wherein the fibrous article is a sheet of paper.

7. The method of claim 5 wherein the fibrous article is a paperboard article.

8. The method of claim 5 wherein the fibrous article is a corrugated paper article.

9. A method of rendering fibrous articles water-resistant that comprises the steps of heating a hot melt polymer/fatty acid composition that is dispersible in a heated nearly neutral to alkaline aqueous pH medium comprising
- A. from about 10% to 90% by weight based upon the total weight of the composition of paraffin wax;
- B. from about 5% to 30% by weight based upon the total weight of the composition of at least one addition polymer of from about 50 to 95 mole percent of maleic anhydride and from about 5 to 50 mole percent of at least one additional ethylenically unsaturated monomer selected from the group consisting of 1-alkenes having from about 10 to 28 carbon atoms, and
- C. from about 5% to 60% by weight based upon the total weight of the composition of stearic acid, the total amount of wax, polymer and stearic acid comprising 100% of the total composition and the polymer is at least 2.5% by weight of the total composition, wherein the composition is a solid at 20° C. but starts to become fluid between about 50° C. and 95° C., until it becomes fluid, applying to a fibrous article an amount of the fluid heated composition that is effective to render it water-resistant, and allowing the composition to cool to room temperature to form a coated fibrous article having a solid coating that is removable upon exposure of the coated fibrous article to a heated nearly neutral to alkaline pH medium.

10. The method of claim 9 wherein the fibrous article is a sheet of paper.

11. The method of claim 9 wherein the fibrous article is a paperboard article.

12. The method of claim 9 wherein the fibrous article is a corrugated paper article.

13. A method of rendering fibrous articles water-resistant that comprises the steps of heating a hot melt polymer/fatty acid composition that is dispersible in a heated nearly neutral to alkaline aqueous pH medium comprising
- A. from about 10% to 90% by weight based upon the total weight of the composition of paraffin wax;
- B. from about 5% to 30% by weight based upon the total weight of the composition of at least one addition polymer of from about 50 to 95 mole percent of maleic anhydride and from about 5 to 50 mole percent of at least one additional ethylenically unsaturated monomer selected from the group consisting of 1-alkenes having from about 10 to 28 carbon atoms, and
- C. from about 5% to 60% by weight based upon the total weight of the composition of stearic acid, the total amount of wax, polymer and stearic acid comprising 100% of the total composition and the polymer is at least 2.5% by weight of the total composition, wherein the composition is a solid at 20° C., but starts to become fluid between about 50° C. and 95° C. and wherein from about 5 to about 30 mole percent of anhydride groups present in the polymer are reacted with taurine, until it becomes fluid, applying to a fibrous article an amount of the fluid heated composition that is effective to render it water-resistant, and allowing the composition to cool to room temperature to form a coated fibrous article having a solid coating that is removable upon exposure of the coated fibrous article to a heated nearly neutral to alkaline pH medium.

14. The method of claim 13 wherein the fibrous article is a sheet of paper.

15. The method of claim 13 wherein the fibrous article is a paperboard article.

16. The method of claim 13 wherein the fibrous article is a corrugated paper article.

17. A method of rendering fibrous articles water-resistant that comprises the steps of heating a hot melt polymer/wax composition that is dispersible in a heated nearly neutral to alkaline aqueous pH medium comprising
- A. from about 20% to 97.5% by weight based upon the total weight of the composition of a water-repellent wax that is a solid at 20° C.;
- B. from about 2.5% to 50% by weight based upon the total weight of the composition of at least one addition polymer selected from the group consisting of
  - (i) a polymer of from about 5 to 95 mole percent of at least one ethylenically unsaturated monocarboxylic acid monomer containing a free carboxyl group and from about 5 to 95 mole percent of at least one additional ethylenically unsaturated monomer,
  - (ii) a polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anhydride having two carboxyl groups in the form of an anhydride group, and from about 5 to 50 mole percent of at least one additional ethylenically unsaturated monomer, and
  - (iii) a polymer of a total of from about 5 to 95 mole percent of (a) at least one of the ethylenically unsaturated monocarboxylic acid monomers and (b) at least one of the ethylenically-unsaturated dicarboxylic monomers and from about 5 to 95 mole percent of at least one additional ethylenically unsaturated monomer, wherein the additional ethylenically unsaturated monomer is selected from the group consisting of 1-alkenes having from about 4 to 60 carbon atoms; alkyl vinyl ethers having an ether alkyl group of from about 8 to 60 carbon atoms, and alkyl acrylates or alkyl methacrylates having an alkyl group of from about 8 to 60 carbon atoms, wherein the polymer is compatible with the water-repellent wax; and
- C. optionally, up to about 77.5% by weight based upon the total weight of the composition of at least one fatty acid selected from the group consisting of natural or synthetic fatty acids containing from about 12 to 48 carbon atoms, wherein the fatty acid is compatible with the polymer and wax, the total amount of wax, polymer and fatty acid comprising 100% of the total composition and the polymer is at least 2.5% by weight of the total composition, wherein the composition is a solid at 20° C., but starts to become fluid between about 50° C. and 95° C., until it becomes fluid, impregnating a fibrous article with an amount of the fluid heated composition that is effective to render it water-resistant, and allowing the composition to cool to room temperature to form an impregnated fibrous article having a binder of the composition that is removable upon exposure of the impregnated fibrous article to a heated nearly neutral to alkaline pH medium.

18. The method as claimed in claim 17 wherein the polymer is at least one addition polymer of from about 50 to 95 mole percent of at least one ethylenically-unsaturated dicarboxylic acid monomer selected from the group consisting of an ethylene-1,2-dicarboxylic acid containing two free carboxyl groups and an ethylene-1,2-dicarboxylic acid anydride having two carboxyl groups in the form of an anhydride group, and from about 5 to 50 mole percent of at least one additional ethylenically unsaturated monomer selected from the group consisting of 1-alkenes having from about 4 to 60 carbon atoms.

19. The method as claimed in claim 18 wherein the composition comprises from about 5% to 30% of the polymer, from about 5% to 60% of the fatty acid and the balance comprising the wax wherein the polymer is a polymer of maleic anhydride and at least one unsaturated monomer selected from the group consisting of 1-alkenes having from about 10 to 28 carbon atoms, the wax is paraffin wax, and the fatty acid is stearic acid.

20. The method as claimed in claim 17 wherein from about 1 mole percent to 90 mole percent of the total carboxyl groups contributed to the polymer by the monocarboxylic acid monomer or by the dicarboxylic acid monomer are reacted with compounds selected from the group consisting of substituted or unsubstituted alcohols having alkyl groups of from about 1 to 48 carbon atoms and primary or secondary substituted or unsubstituted amines having alkyl groups of from about 1 to 30 carbon atoms.

21. The method as claimed in claim 20 wherein from about 5 to about 30 mole percent of the anhydride groups are reacted with taurine.

22. The method as claimed in claim 17 wherein the composition includes a fatty acid.

23. The method as claimed in claim 22 wherein the fatty acid is selected from the group consisting of fatty acids having from about 16 to 22 carbon atoms.

24. The method as claimed in claim 17 wherein the composition comprises from about 5% to 30% of the polymer, from about 5% to 60% of the fatty acid and the balance comprising the wax.

25. The method as claimed in claim 24 wherein the weight ratio of polymer to fatty acid is from 25:75 to 75:25.

26. The method as claimed in claim 17 wherein the wax is selected from the group consisting of paraffin wax, microcrystalline wax and mixtures thereof.

27. The method as claimed in claim 1 wherein from about 1 mole percent to 90 mole percent of the total carboxyl groups contributed to the polymer by the monocarboxylic acid monomer or by the dicarboxylic acid monomer are reacted with compounds selected from the group consisting of substituted or unsubstituted alcohols having alkyl groups of from about 1 to 48 carbon atoms and primary or secondary substituted or unsubstituted amines having alkyl groups of from about 1 to 30 carbon atoms.

28. The method as claimed in claim 27 wherein from about 5 to about 30 mole percent of the anhydride groups are reacted with taurine.

29. The method as claimed in claim 1 wherein the composition includes a fatty acid.

30. The method as claimed in claim 29 wherein the fatty acid is selected from the group consisting of fatty acids having from about 16 to 22 carbon atoms.

31. The method as claimed in claim 1 wherein the composition comprises from about 5% to 30% of the polymer, from about 5% to 60% of the fatty acid and the balance comprising the wax.

32. The method as claimed in claim 31 wherein the weight ratio of polymer to fatty acid is from 25:75 to 75:25.

33. The method as claimed in claim 1 wherein the wax is selected from the group consisting of paraffin wax, microcrystalline wax and mixtures thereof.

34. The method as claimed in claim 5 wherein from about 1 mole percent to 90 mole percent of the total carboxyl groups contributed to the polymer by the dicarboxylic acid monomer are reacted with compounds selected from the group consisting of substituted or unsubstituted alcohols having alkyl groups of from about 1 to 48 carbon atoms and primary or secondary substituted or unsubstituted amines having alkyl groups of from about 1 to 30 carbon atoms.

35. The method as claimed in claim 34 wherein from about 5 to about 30 mole percent of the anhydride groups are reacted with taurine.

36. The method as claimed in claim 5 wherein the composition includes a fatty acid.

37. The method as claimed in claim 36 wherein the fatty acid is selected from the group consisting of fatty acids having from about 16 to 22 carbon atoms.

38. The method as claimed in claim 5 wherein the composition comprises from about 5% to 30% of the polymer, from about 5% to 60% of the fatty acid and the balance comprising the wax.

39. The method as claimed in claim 38 wherein the weight ratio of polymer to fatty acid is from 25:75 to 75:25.

40. The method as claimed in claim 5 wherein the wax is selected from the group consisting of paraffin wax, microcrystalline wax and mixtures thereof.

41. The method as claimed in claim 9 wherein from about 1 mole percent to 90 mole percent of the total carboxyl groups contributed to the polymer by the monocarboxylic acid monomer or by the dicarboxylic acid monomer are reacted with compounds selected from the group consisting of substituted or unsubstituted alcohols having alkyl groups of from about 1 to 48 carbon atoms and primary or secondary substituted or unsubstituted amines having alkyl groups of from about 1 to 30 carbon atoms.

42. The method as claimed in claim 41 wherein from about 5 to about 30 mole percent of the anydride groups are reacted with taurine.

43. The method as claimed in claim 9 wherein the weight ratio of polymer to fatty acid is from 25:75 to 75:25.

44. The method as claimed in claim 13 wherein the weight ratio of polymer to fatty acid is from 25:75 to 75:25.

* * * * *